United States Patent
Lewis et al.

(10) Patent No.: US 6,873,473 B2
(45) Date of Patent: Mar. 29, 2005

(54) TWO POSITION VARIABLE FOCAL LENGTH LENS

(75) Inventors: Alan E. Lewis, Rochester, NY (US); Joel S. Lawther, East Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 214 days.

(21) Appl. No.: 10/225,669

(22) Filed: Aug. 22, 2002

(65) Prior Publication Data

US 2004/0036981 A1 Feb. 26, 2004

(51) Int. Cl.[7] .............................................. G02B 13/18
(52) U.S. Cl. ...................................... 359/717; 359/740
(58) Field of Search .............................. 359/717, 740, 359/676, 681, 691, 693, 739

(56) References Cited

U.S. PATENT DOCUMENTS

| | | | | |
|---|---|---|---|---|
| 3,637,282 A | * | 1/1972 | Hayamizu et al. | |
| 4,871,238 A | * | 10/1989 | Sato et al. | |
| 5,000,552 A | * | 3/1991 | Simpson et al. | 359/740 |
| 5,067,803 A | * | 11/1991 | Ohno | |
| 5,321,548 A | | 6/1994 | Takase | |
| 5,327,291 A | * | 7/1994 | Baker et al. | |
| 5,515,206 A | | 5/1996 | Peng | |
| 5,659,429 A | * | 8/1997 | Kudo | |
| 5,677,798 A | * | 10/1997 | Hirano et al. | |
| 6,011,660 A | * | 1/2000 | Nagahara | 359/793 |
| 6,282,377 B1 | * | 8/2001 | Lawther et al. | |
| 6,307,683 B1 | | 10/2001 | Miyano | |

FOREIGN PATENT DOCUMENTS

JP    59193405    2/1984

* cited by examiner

*Primary Examiner*—Hung X. Dang
(74) *Attorney, Agent, or Firm*—William R. Zimmerli

(57) ABSTRACT

A two position variable focal length lens is provided. The variable focal length lens includes a common lens element moveably positioned on an optical axis; a wide angle lens element moveable between a first location removed from the optical axis and a first position on the optical axis on an image side of the common lens element; and a telephoto lens element moveable between a second location removed from the optical axis and a second position on the optical axis on the image side of the common lens element. A magnification ratio change is effected by moving the common lens element along the optical axis and switching between the wide angle lens element located at the first position on the optical axis and the telephoto lens element located at the second position on the optical axis.

35 Claims, 20 Drawing Sheets

TWO POSITION VARIABLE FOCAL LENGTH LENS

FIELD OF THE INVENTION

This invention relates generally to lens design, and in particular to a variable focal length lens for use in a camera.

BACKGROUND OF THE INVENTION

Zoom lens system in which the rear or image side lens units switch out of and into an optical path are known. For example, U.S. Pat. No. 4,871,238, which issued to Sato et al., on Oct. 3, 1989, discloses a photographic optical device including a master lens unit having a positive refractive power; a first auxiliary lens unit having a positive refractive power capable of being placed on and off the optical path; and a second auxiliary lens unit having a negative refractive power capable of being placed on and off the optical path. The first auxiliary lens unit is attached to an image-plane side of the master lens unit to form a photographic unit giving a low ratio of magnification. The second auxiliary lens unit is attached to an image-plane side of the master lens unit to form another photographic unit giving a high ratio of magnification. The first and second auxiliary lens units are placed outside of the optical path to form another photographic unit giving a middle ratio of magnification. The zoom lens system disclosed in U.S. Pat. No. 4,871,238 is disadvantaged in that each lens unit requires many individual lens components which increases manufacturing costs associated with building the zoom lens system and increases the complexity of the design of the zoom lens system. Additionally, the zoom lens system disclosed in U.S. Pat. No. 4,871,238 includes a wide angle, mid- range, and telephoto format (lens position) which increases the cost and complexity associated with the lens driving mechanism.

Lens systems having a reduced number of individual lens components are also known. For example, U.S. Pat. No. 5,677,798, which issued to Hirano et al., on Oct. 14, 1997, discloses an image forming lens system including a positive front lens group, a diaphragm, and a rear lens group, in order from an object to be imaged. The front lens group is made of optical glass. The rear lens group is made of a single meniscus plastic lens having opposed aspheric lens surfaces with a concave surface adjacent to the diaphragm. Additionally, U.S. Pat. No. 5,067,803, which issued to Ohno, on Nov. 26, 1991, discloses a photographic wide angle lens which is composed of, from an object side thereof, a first lens of positive meniscus having a convex surface on the object side, and a second lens of positive meniscus having a concave surface on the object side. The wide angle lens has an aspheric surface at least on one of the four lens surfaces provided by the first and second lenses. While the lens systems disclosed in U.S. Pat. Nos. 5,677,798 and 5,067,803 have a reduced number of individual lens elements, each lens system is disadvantaged in that the ratio of magnification of the lens system can not be changed.

Recent surveys of picture taking consumers using a zoom lens indicated that over 90% of all photographs are shot in either a wide angle format or a telephoto format. As such, there is a need for a variable focal length lens system having a reduced number of individual lens components capable of switching between a wide angle format and a telephoto format.

SUMMARY OF THE INVENTION

According to one feature of the present invention, a two position variable focal length lens includes a common lens element moveably positioned on an optical axis. A wide angle lens element is moveable between a first location removed from the optical axis and a first position on the optical axis on an image side of the common lens element. A telephoto lens element is moveable between a second location removed from the optical axis and a second position on the optical axis on the image side of the common lens element. A magnification ratio change is effected by moving the common lens element along the optical axis and switching between the wide angle lens element located at the first position on the optical axis and the telephoto lens element located at the second position on the optical axis. The two position variable focal length lens satisfies the following condition: $|c-f_{ZT}|<|-f_{ZW}$, where $f_C$ is a focal length of the common lens element, $f_{ZT}$ is a focal length of the two position variable focal length lens in a telephoto position, and $f_{ZW}$ is a focal length of the two position variable focal length lens in a wide angle position.

According to another feature of the present invention, a two position variable focal length lens includes a common lens element moveably positioned on an optical axis. The common lens element has an image side surface with the image side surface having a curvature. The common lens element satisfies the following condition: $(1/-20.8) \leq c \leq (1/5)$, where c is the curvature of the image side surface. A wide angle lens element is moveable between a first location removed from the optical axis and a first position on the optical axis on an image side of the common lens element. A telephoto lens element is moveable between a second location removed from the optical axis and a second position on the optical axis on the image side of the common lens element. A magnification ratio change is effected by moving the common lens element along the optical axis and switching between the wide angle lens element located at the first position on the optical axis and the telephoto lens element located at the second position on the optical axis.

According to another feature of the present invention, a two position variable focal length lens includes a common lens element moveably positioned on an optical axis. A wide angle lens element is moveable between a first location removed from the optical axis and a first position on the optical axis on an image side of the common lens element. A first aperture stop is moveably positioned with the wide angle lens element on an object side of the wide angle lens element. A telephoto lens element is moveable between a second location removed from the optical axis and a second position on the optical axis on the image side of the common lens element. A second aperture stop is moveably positioned with the telephoto lens element on an object side of the telephoto lens element. A magnification ratio change is effected by moving the common lens element along the optical axis and switching between the first aperture stop and the wide angle lens element located at the first position on the optical axis and the second aperture stop and the telephoto lens element located at the second position on the optical axis such that a distance between the common lens element and the first aperture stop is equivalent to a distance between the common lens element and the second aperture stop.

According to another feature of the present invention, a two position variable focal length lens includes a common lens element moveably positioned on an optical axis. A wide angle lens element having aspheric surfaces is moveable between a first location removed from the optical axis and a first position on the optical axis on an image side of the common lens element. A telephoto lens element having aspheric surfaces is moveable between a second location removed from the optical axis and a second position on the optical axis on the image side of the common lens element. A magnification ratio change is effected by moving the common lens element along the optical axis and switching between the wide angle lens element located at the first position on the optical axis and the telephoto lens element located at the second position on the optical axis. The aspheric surfaces of the telephoto lens element have base radii that are larger than corresponding base radii of the aspheric surfaces of the wide angle lens element.

According to another feature of the present invention, a two position variable focal length lens includes a common lens element moveably positioned on an optical axis. A wide angle lens element is moveable between a first location removed from the optical axis and a first position on the optical axis on an image side of the common lens element. A telephoto lens element is moveable between a second location removed from the optical axis and a second position on the optical axis on the image side of the common lens element, wherein a magnification ratio change is effected by moving the common lens element along the optical axis and switching between the wide angle lens element located at the first position on the optical axis and the telephoto lens element located at the second position on the optical axis. The two position variable focal length lens satisfies the following condition: $f_C > ((f_{ZW} + f_{ZT})/2)$, where $f_C$ is a focal length of the common lens element, $f_{ZW}$ is a focal length of the two position variable focal length lens in a wide angle position, and $f_{ZT}$ is a focal length of the two position variable focal length lens in a telephoto position.

According to another feature of the present invention, a method of changing a magnification ratio from a wide angle position to telephoto angle position includes providing a common lens element positioned at a first location on an optical axis; providing a wide angle lens element located at a first position on the optical axis on an image side of the common lens element; providing a telephoto lens element located at a location removed from the optical axis; moving the common lens element toward an object plane; moving the telephoto lens element to a second position on the optical axis on the image side of the common lens element; and removing the wide angle lens from the optical axis.

BRIEF DESCRIPTION OF THE DRAWINGS

In the detailed description of the embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1A:
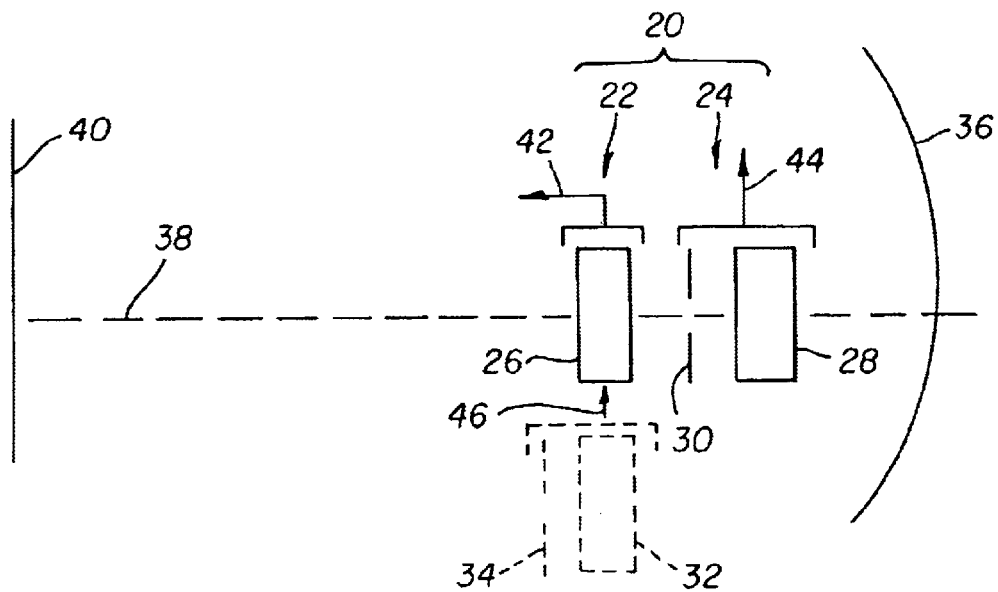
FIGS. 1A and 1B are schematic cross sectional views of an embodiment made in accordance with the present invention in a wide angle zoom position and telephoto zoom position.
Figure 1B:
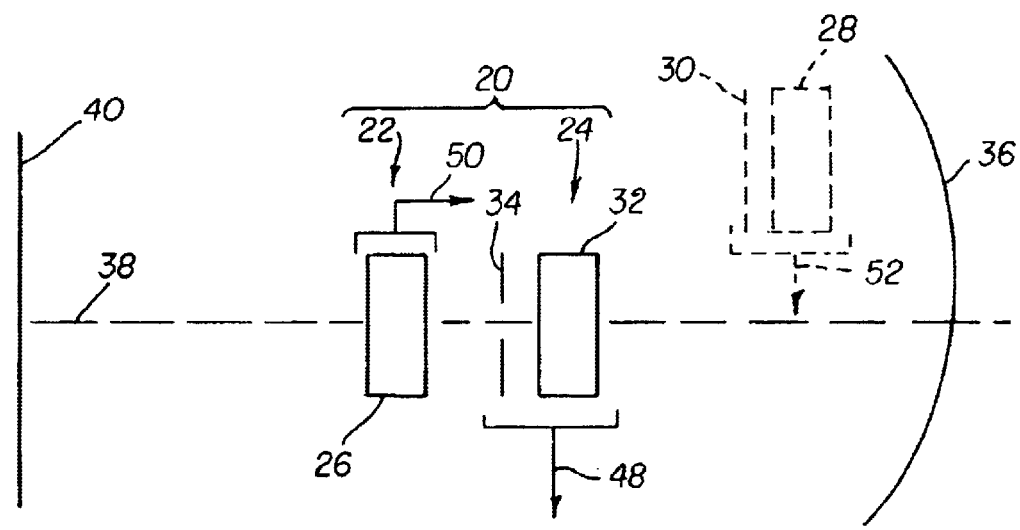

Referring to FIGS. 1A and 1B, a two position variable focal length lens 20 is shown. The two position variable focal length lens 20 includes a first lens unit 22 and a second lens unit 24, as viewed from an object side of the two position variable focal length lens 20. As shown in FIG. 1A, the first lens unit 22 includes a common lens element 26 while the second lens unit 24 includes a wide angle lens element 28. An aperture stop 30 is positioned between common lens element 26 and wide angle lens element 28. As shown in FIG. 1B, the first lens unit 22 includes the common lens element 26 while the second lens unit 24 includes a telephoto lens element 32. A second aperture stop 34 is positioned between the common lens element 26 and the telephoto lens element 32. Image plane 36 is cylindrically curved.

Zooming in and zooming out are accomplished by moving the common lens element 26 along a optical axis 38 while switching between wide angle lens element 28 and telephoto lens element 32. For example, as shown in FIG. 1A, two position variable focal length lens 20 is in a wide angle position. As such, two position variable focal length lens 20 includes aperture stop 30 positioned between common lens element 26 and wide angle lens element 28. When a telephoto position is desired, common lens element 26 moves toward object plane 40 in a direction as indicated by arrow 42 while wide angle lens 28 moves out of the optical axis 38 in a direction as indicated by arrow 44. As this is occurring, telephoto lens element 32 (shown in phantom in FIG. 1A) moves into optical axis 38 in a direction as indicated by arrow 46 after common lens element 26 is located on the object side of telephoto lens element 32. This completes the zoom in process which results in the two position variable focal length lens 20 being in a telephoto position, as shown in FIG. 1B.

When a wide angle position is desired, the telephoto lens element 32 moves out of the optical axis 38 in a direction as indicated by arrow 48 while common lens element 26 moves toward image plane 36 in a direction as indicated by arrow 50. Wide angle lens element 28 moves into optical axis 38 in a direction as indicated by arrow 52 such that common lens element 26 is on the object side of wide angle lens element 32. This completes the zoom out process which results in the two position variable focal length lens 20 being in the wide angle position as shown in FIG. 1A.

While the motion of the wide angle lens element 28 and the telephoto lens element 32 is generally perpendicular to the optical axis 38, other motion angles can be incorporated with substantially similar results. The motion of common lens element 26 is generally parallel to optical axis 38. Additionally, aperture stop 30 moves into and out of optical axis 38 with wide angle lens element 28 while second aperture stop 34 moves into and out of optical axis 38 with telephoto lens element 32. Finally, common lens element 26 does not stop at a mid-range position. The movement of two position variable focal length lens 20 is from a wide angle position directly to a telephoto position or directly from a telephoto position to a wide angle position.

Figure 2A:
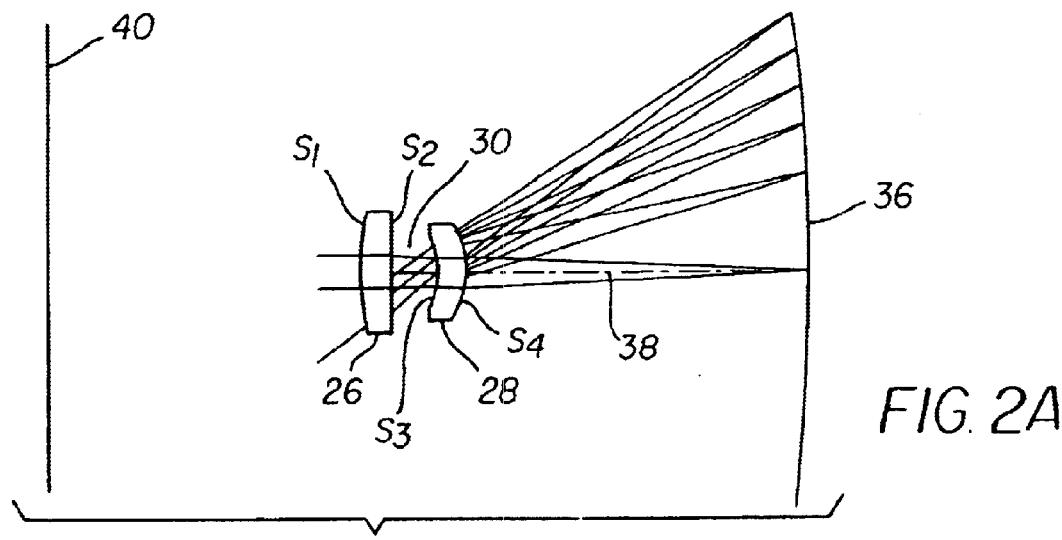
FIGS. 2A and 2B are cross sectional views of first and second numerical examples made in accordance with the present invention in a wide angle zoom position and a telephoto zoom position.
Figure 2B:
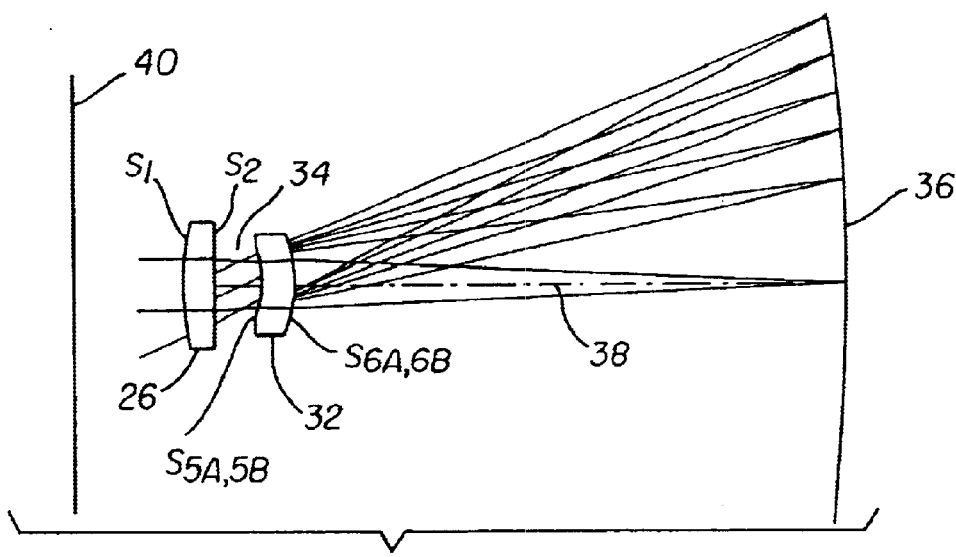

Referring to FIGS. 2A and 2B, a first example of the two position variable focal length lens 20 is shown. FIG. 2A shows two position variable focal length lens 20 in a wide angle format or position while FIG. 2B show two position variable focal length lens 20 in a telephoto format or position. Common lens element 26 is glass and includes surface $S_1$ which is spherical and convex toward the object plane 40 while surface $S_2$ is piano. Wide angle lens element 28 is plastic (for example, acrylic plastic or PMMA, etc.) and includes surfaces $S_3$ and $S_4$ which are both aspheric. Telephoto lens element 32 is plastic (styrene) and includes surfaces $S_{5A}$ and $S_{6A}$ which are both aspheric.

A second example is also shown in FIGS. 2A and 2B. In this example, common lens element 26 is glass and includes surface $S_1$ which is spherical and convex toward the object plane 40 while surface $S_2$ is piano. Wide angle lens element 28 is plastic (for example, acrylic plastic or PMMA, etc.) and includes surfaces $S_3$ and $S_4$ which are both aspheric. Telephoto lens element 32 is plastic (for example, acrylic or PMMA, etc.) and includes surfaces $S_{5B}$ and $S_{6B}$ which are both aspheric.

EXAMPLES 1 and 2

FIGS. 2A–2B

| Surface | Radius | Thickness | Index | V |
|---|---|---|---|---|
| $S_1$ | 20.7488 | 2.499 | 1.517 | 64.2 |
| $S_2$ | plano | 2.161 | | |
| STOP wide angle | diaphragm | 1.664 | | |
| $S_3$ | asphere | 2.500 | 1.492 | 57.4 |
| $S_4$ telephoto 1 | asphere | | | |
| $S_{5A}$ | asphere | 2.500 | 1.590 | 30.9 |
| $S_{6A}$ telephoto 2 | asphere | | | |
| $S_{5B}$ | asphere | 2.500 | 1.492 | 57.4 |
| $S_{6B}$ | asphere | | | |

ASPHERIC EQUATION for surfaces $S_3$–$S_{6A}$:

$$X = \frac{CY^2}{1 + \sqrt{1 - (k+1)C^2 Y^2}} + DY^4 + EY^6 + FY^8 + GY^{10} + HY^{12} + IY^{14} + JY^{16}$$

Surface $S_3$:

C = −0.15420764  D = −0.6102268E−03  F = −0.5459696E−04  H = 0.2136513E−05
k = 0            E = 0.1320045E−03   G = 0.5290771E−05   I = −0.4709130E−06
                                                          J = 0.2424784E−07

Surface $S_4$:

C = −0.16406247  D = 0.4134610E−04   F = 0.5126819E−05   H = −0.1939498E−08
k = 0            E = −0.1706174E−04  G = −0.4149921E−06  I = 0.2729591E−08
                                                          J = −0.1170938E−09

Surface $S_{5A}$:

C = −0.1122254   D = 0.3331735E−03   F = 0.2060900E−04   H = −0.1077000E−06
k = 0            E = −0.2999852E−04  G = −0.3665477E−05  I = 0.1144493E−06
                                                          J = −0.9815623E−08

Surface $S_{6A}$:

C = −0.0995002   D = 0.2473666E−03   F = 0.3904813E−05   H = 0.2350041E−07
k = 0            E = −0.5835636E−05  G = −0.4983947E−06  I = 0.5129185E−09
                                                          J = −0.5786020E−10

ASPHERIC EQUATION for surfaces $S_{5B}$ and $S_{6B}$:

$$X = \frac{CY^2}{1 + \sqrt{1 - (k+1)C^2 Y^2}} + DY^4 + EY^6 + FY^8 + GY^{10}$$

-continued

Surface $S_{5B}$:

| | | |
|---|---|---|
| C = −0.11651826 | D = 0.3604447E−03 | F = 0.4611370E−05 |
| k = 0 | E = −0.1543348E−06 | G = −0.2947564E−06 |

Surface $S_{6B}$:

| | | |
|---|---|---|
| C = −0.10340955 | D = 0.2667438E−03 | F = 0.0 |
| k = 0 | E = 0.1049829E−04 | G = 0.0 |

| | Focal Length | Back Focus | Front Focus | Best Focus | Lens Length | Exit Pupil Diameter | Relative Aperture |
|---|---|---|---|---|---|---|---|
| Wide angle | 28.80 | 26.82 | 22.50 | −0.008 | 8.824 | 3.15 | 10 |
| Telephoto 1 | 46.53 | 42.54 | 42.56 | −0.147 | 8.824 | 4.31 | 11 |
| Telephoto 2 | 46.47 | 42.03 | 42.89 | 0.138 | 8.824 | 4.27 | 11 |

In wide angle format, Examples 1 and 2 have a cylindrically curved image plane with a radius=−120.0; a semi-field of 36.45°; and a semi-diagonal of 21.63 (Illum.), 20.58 (Image). The first lens element 26 has a focal length of 40.000 mm, and the second lens element 28 has a focal length of 65.834 mm.

In telephoto 1 format, Example 1 has a cylindrically curved image plane with a radius=−120.0; a semi-field of 24.66°; and a semi-diagonal of 21.63 (Illum.), 20.58 (Image). The first lens element 26 has a focal length of 40.000 mm, and the second lens element 32 has a focal length of −727.007 mm.

In telephoto 2 format, Example 2 has a cylindrically curved image plane with a radius=−120.0; a semi-field of 24.64°; and a semi-diagonal of 21.63 (Illum.), 20.58 (Image). The first lens element 26 has a focal length of 40.000, and the second lens element 32 has a focal length of −642.625.

Figure 3A:
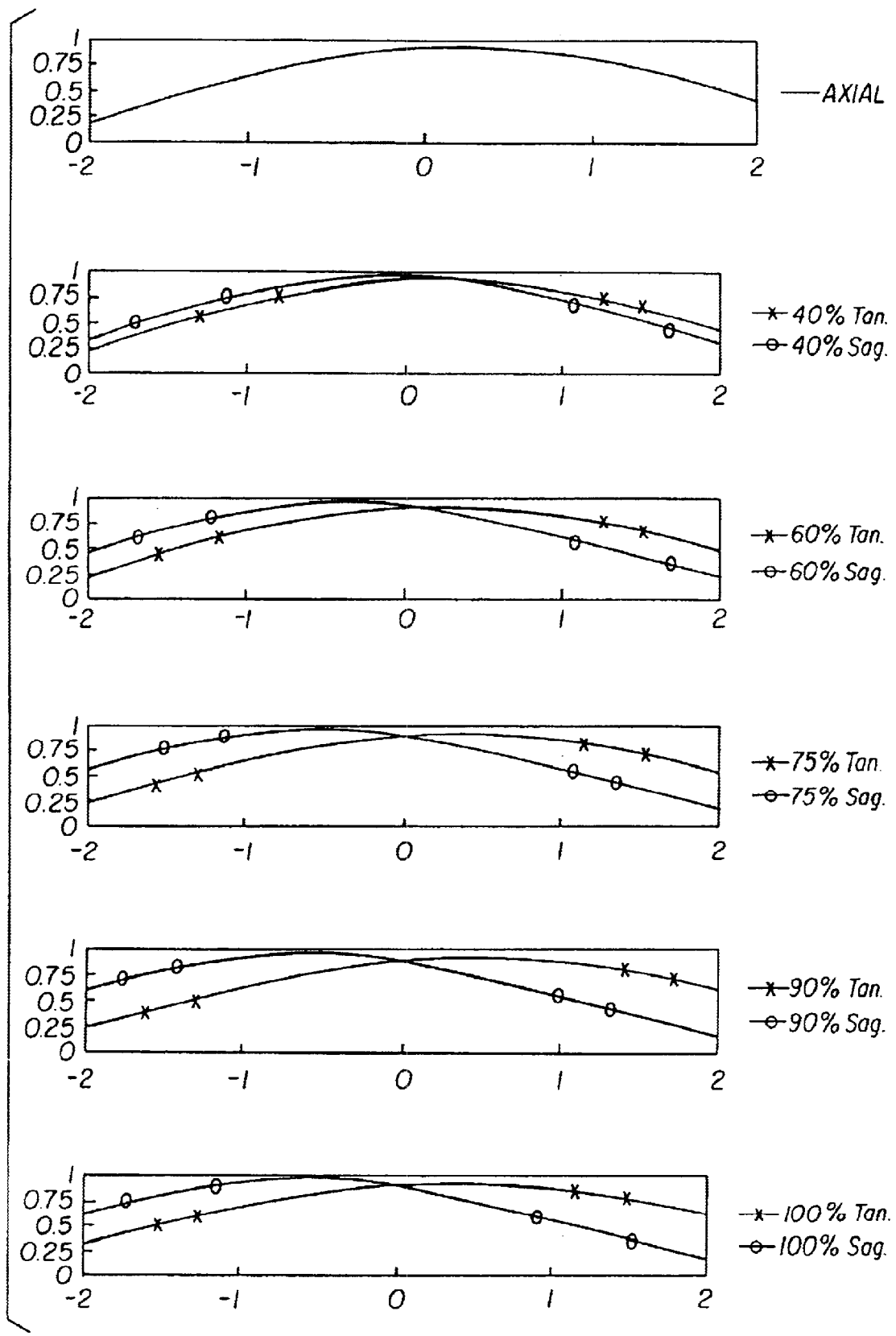
FIGS. 3A–3C are MTF performance plots of the first and second examples shown in FIGS. 2A and 2B.
Figure 3B:
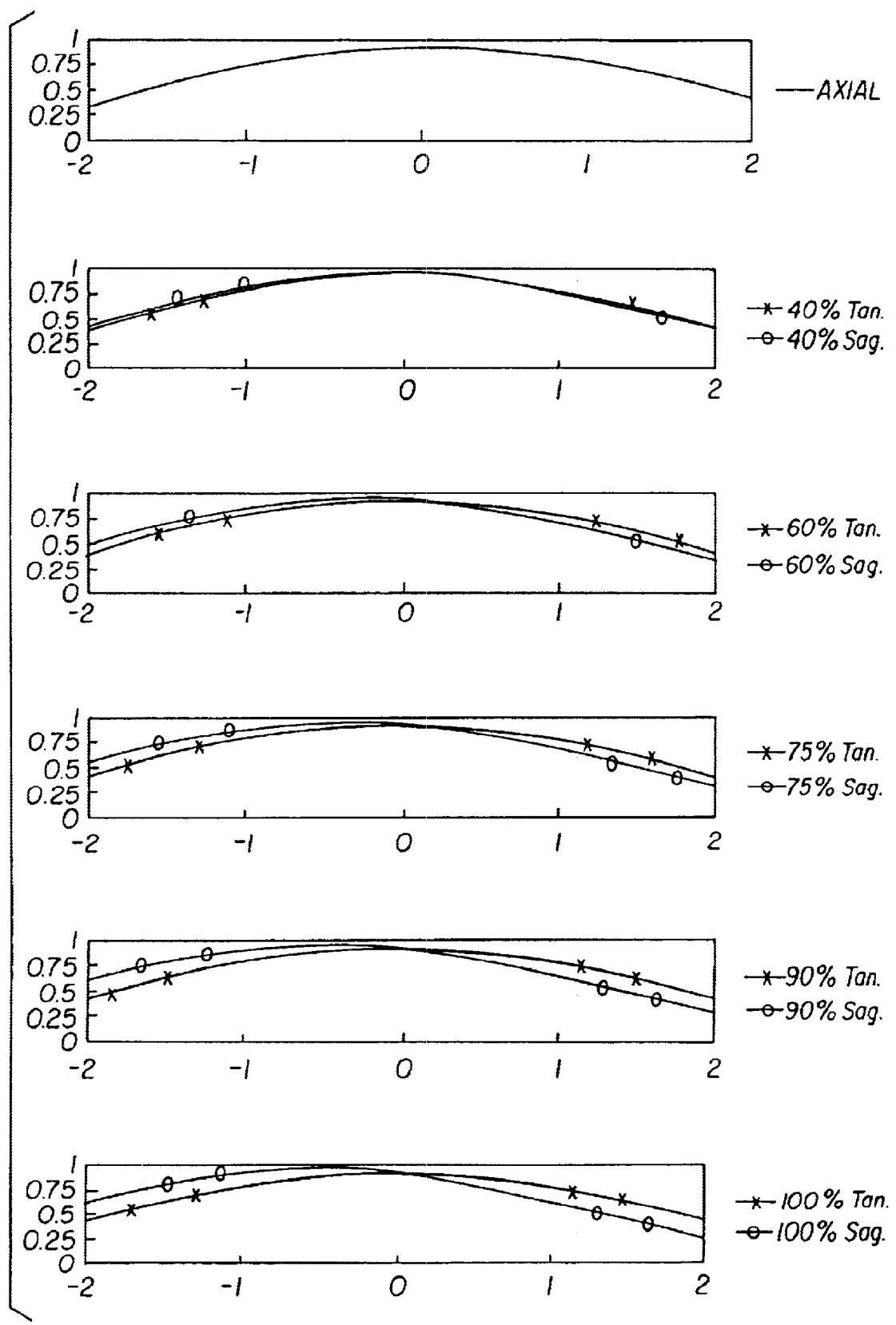
Figure 3C:
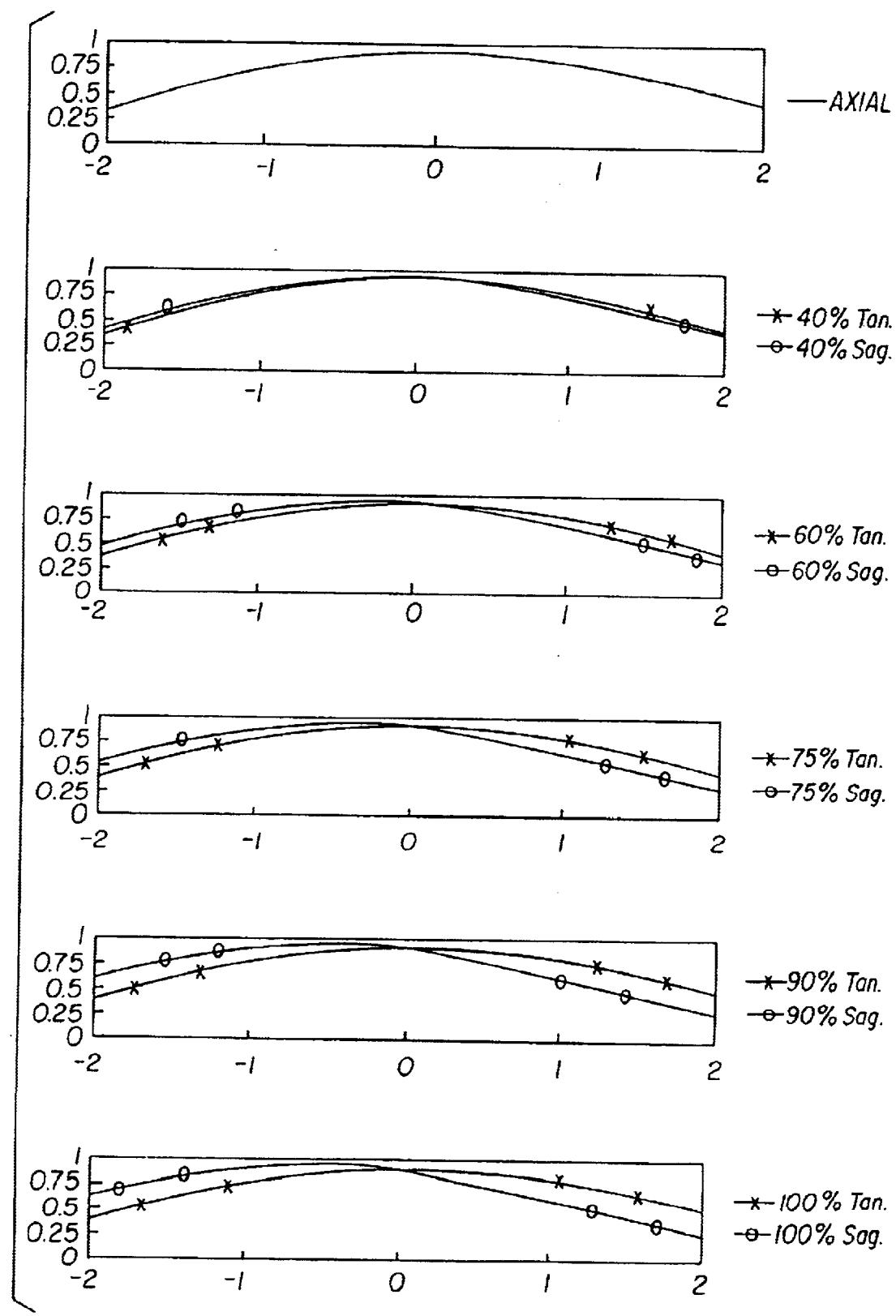

Referring to FIGS. 3A–3C, MTF performance plots are measured at best focus using weighted wavelengths (440 nanometers at 15%, 546.1 nanometers at 50%, and 650 nanometers at 35%) at a frequency of 4.45 cycles per millimeter with full field (100%) being 20.58 mm. FIG. 3A shows MTF plots for Examples 1 and 2 in wide angle format. FIG. 3B shows MTF plots for Example 1 in telephoto (telephoto 1) format. FIG. 3C shows MTF plots for Example 2 in an alternative telephoto (telephoto 2) format.

MTF plots are centered along the diagonal of the film cylinder (long dimension of 24×36 mm image format is measured along cylinder radius of curvature in all examples).

Figure 4A:
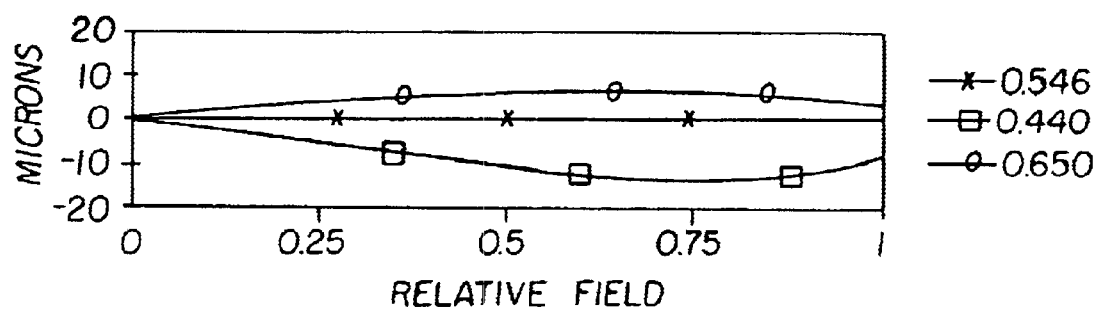
FIGS. 4A–4C are lateral color aberration curves for the first and second examples shown in FIGS. 2A and 2B.
Figure 4B:
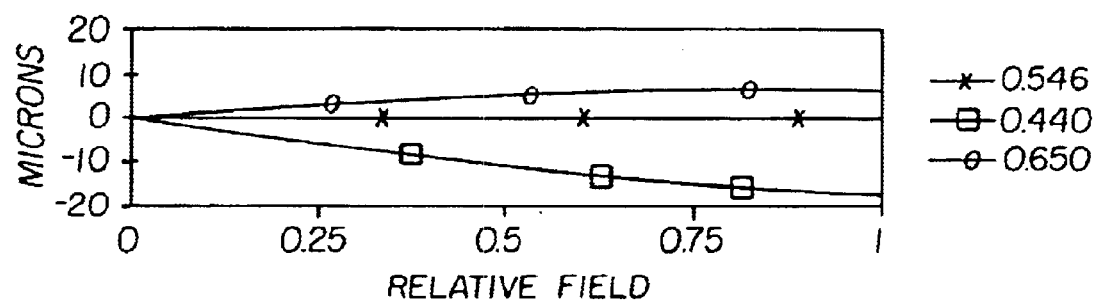
Figure 4C:
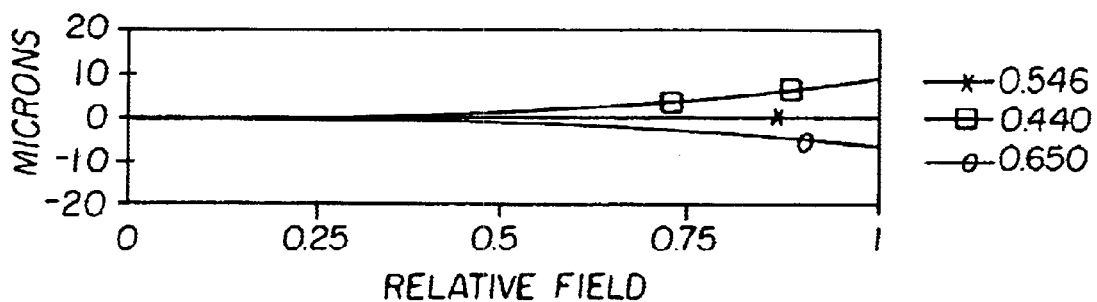

FIGS. 4A–4C describe additional performance characteristics of the variable focal length lens 20 of Examples 1 and 2. FIG. 4A shows lateral color correction for Examples 1 and 2 in wide angle format. FIG. 4B shows lateral color correction for Example 1 in telephoto (telephoto 1) format. FIG. 4C shows lateral color correction for Example 1 in the alternative telephoto (telephoto 2) format.

Figure 5A:
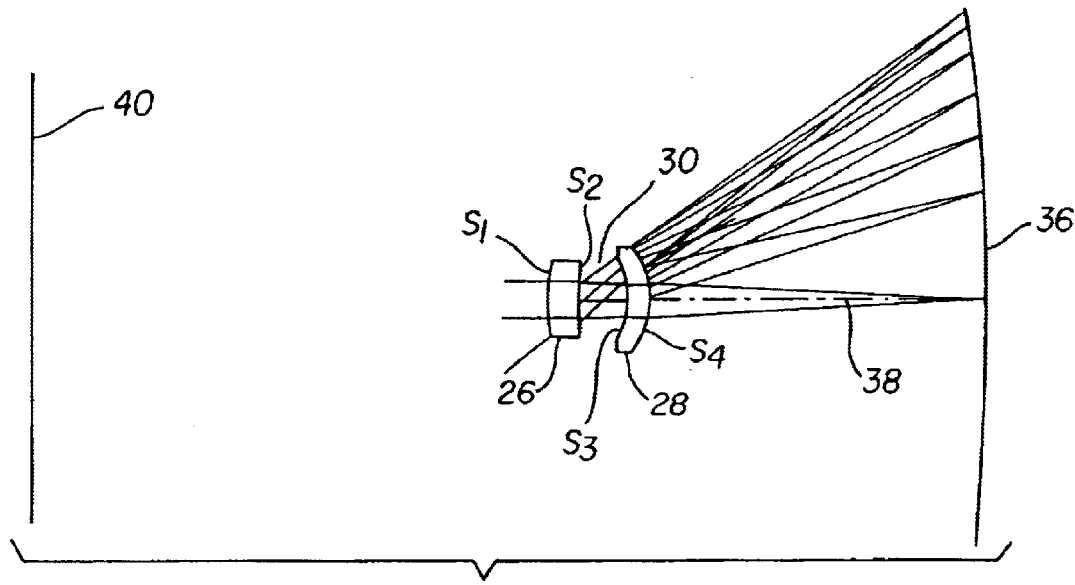
FIGS. 5A and 5B are cross sectional views of third and fourth numerical examples made in accordance with the present invention in a wide angle zoom position and a telephoto zoom position.
Figure 5B:
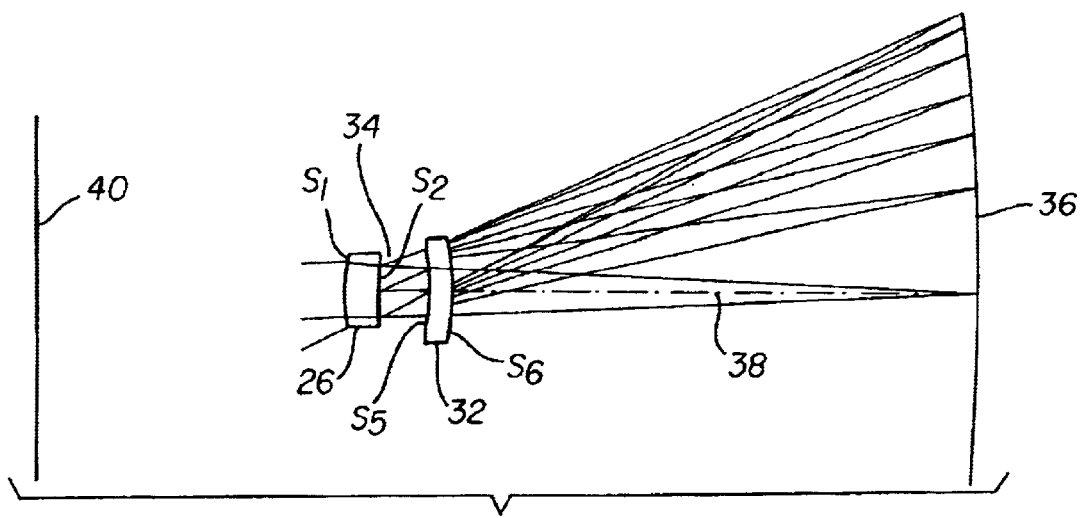

Referring to FIGS. 5A and 5B, a third example of the two position variable focal length lens 20 is shown. FIG. 5A shows two position variable focal length lens 20 in a wide angle format or position while FIG. 5B show two position variable focal length lens 20 in a telephoto format or position. Common lens element 26 is a meniscus glass lens and includes spherical surfaces $S_1$ and $S_2$ with surface $S_1$ being convex toward the object plane 40. Wide angle lens element 28 is plastic (for example, acrylic or PMMA, etc.) and includes surfaces $S_3$ and $S_4$ which are both aspheric. Telephoto lens element 32 is plastic (for example, acrylic or PMMA, etc.) and includes surfaces $S_5$ and $S_6$ which are both aspheric.

EXAMPLE 3

FIGS. 5A and 5B

| Surface | Radius | Thickness | Index | V |
|---|---|---|---|---|
| $S_1$ | 11.8245 | 2.5080 | 1.517 | 64.2 |
| $S_2$ | 25.5000 | 0.3000 | | |
| STOP wide angle | diaphragm | 3.3692 | | |
| $S_3$ | asphere | 1.7241 | 1.492 | 57.4 |
| $S_4$ telephoto | asphere | | | |
| $S_5$ | asphere | 1.7241 | 1.492 | 57.4 |
| $S_6$ | asphere | | | |

ASPHERIC EQUATION for surfaces $S_3$–$S_6$:

$$X = \frac{CY^2}{1 + \sqrt{1-(k+1)C^2Y^2}} + DY^4 + EY^6 + FY^8 + GY^{10}$$

-continued

Surface S₃:

| | | |
|---|---|---|
| C = −0.13847405 | D = −0.428189E−03 | F = −0.101596E−04 |
| k = 0 | E = 0.426948E−04 | G = 0.350162E−06 |

Surface S₄:

| | | |
|---|---|---|
| C = −0.15511068 | D = −0.113785E−03 | F = −0.322740E−05 |
| k = 0 | E = 0.358426E−04 | G = 0.731344E−07 |

Surface S₅:

| | | |
|---|---|---|
| C = −0.0597393 | D = 0.377504E−03 | F = 0.383276E−06 |
| k = 0 | E = −0.123211E−04 | G = −0.232214E−08 |

Surface S₆:

| | | |
|---|---|---|
| C = −0.05134647 | D = 0.401549E−03 | F = 0 |
| k = 0 | E = −0.394677E−06 | G = 0 |

| | Focal Length | Back Focus | Front Focus | Best Focus | Lens Length | Exit Pupil Diameter | Relative Aperture |
|---|---|---|---|---|---|---|---|
| Wide angle | 28.81 | 25.15 | 24.91 | −0.233 | 7.9013 | 3.11 | 10 |
| Telephoto | 46.46 | 38.81 | 47.44 | −0.126 | 7.9013 | 4.05 | 11 |

In wide angle, Example 3 has a cylindrically curved image plane with a radius=−120.0; a semi-field of 36.55°; and a semi-diagonal of 21.63 (Illum.), 20.58 (Image). The first lens element 26 has a focal length of 40.000 mm, and the second lens element 28 has a focal length of 70.131 mm.

In telephoto, Example 3 has a cylindrically curved image plane with a radius=−120.0; a semi-field of 24.38°; and a semi-diagonal of 21.63 (Illum.), 20.58 (Image). The first lens element 26 has a focal length of 40.000 mm, and the second lens element 32 has a focal length of −304.786 mm.

Figure 6A:
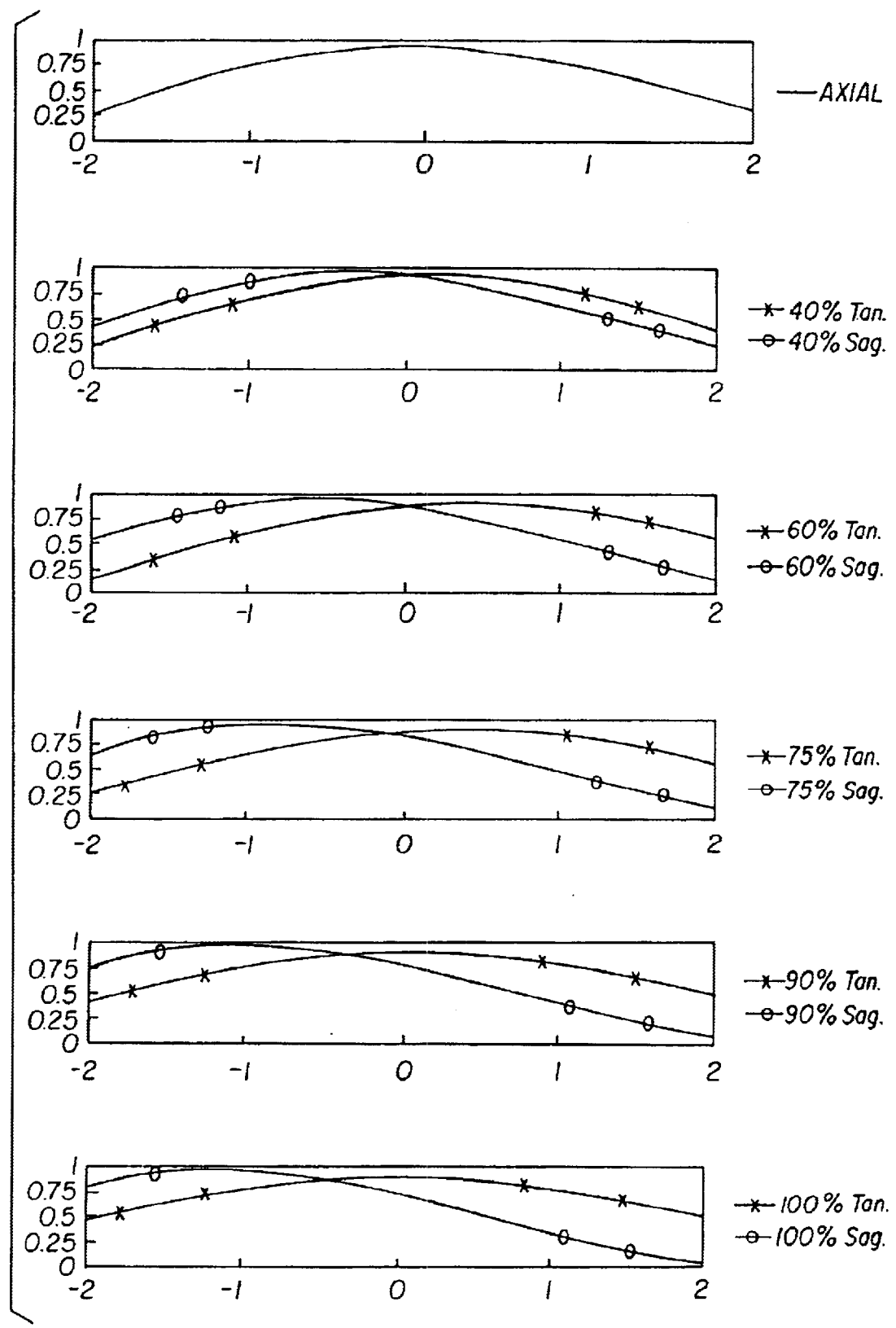
FIGS. 6A–7B are MTF performance plots of the third and fourth examples, respectively, shown in FIGS. 5A and 5B.
Figure 6B:
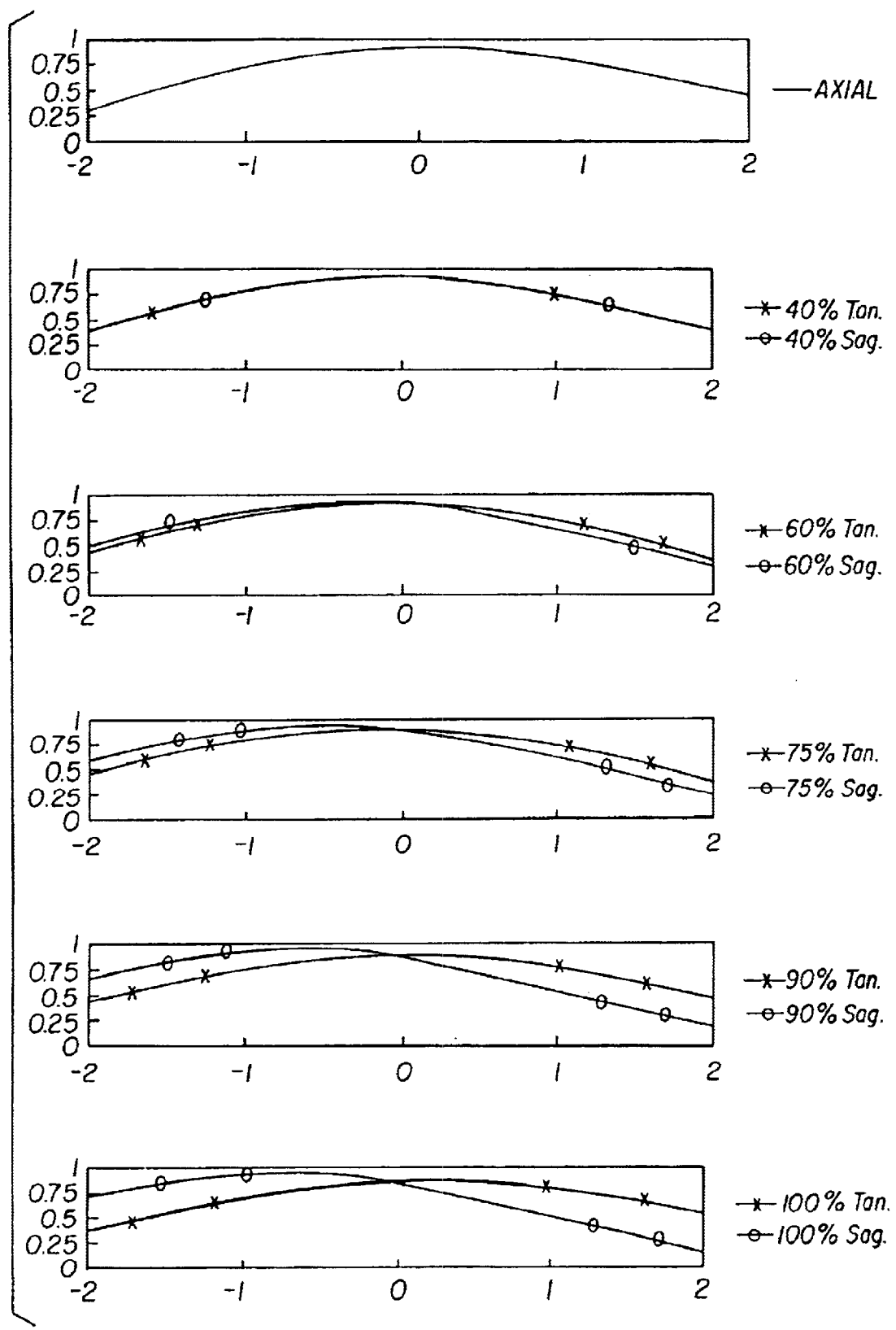

Referring to FIGS. 6A–6B, MTF performance plots are measured at best focus using weighted wavelengths (440 nanometers at 15%, 546.1 nanometers at 50%, and 650 nanometers at 35%) at a frequency of 4.45 cycles per millimeter with full field (100%) being 20.58 mm. FIG. 6A shows MTF plots for Example 3 in wide angle format. FIG. 6B shows MTF plots for Example 3 in telephoto format. MTF plots are centered along the diagonal of the film cylinder (long dimension of 24×36 mm image format is measured along cylinder radius of curvature in all examples).

Figure 8A:
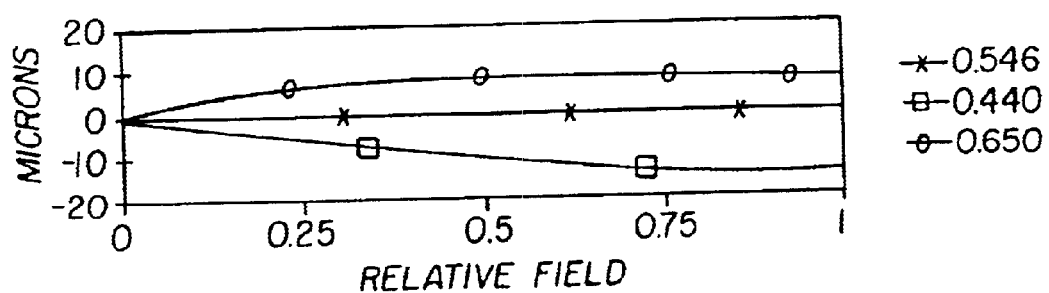
FIGS. 8A–9B are lateral color aberration curves for the third and fourth examples, respectively, shown in FIGS. 5A and 5B.
Figure 8B:
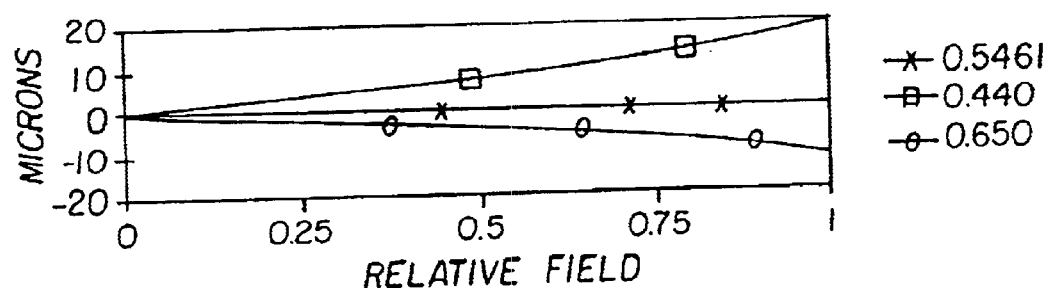

FIGS. 8A–8B describe additional performance characteristics of the variable focal length lens 20 of Example 3. FIG. 8A shows lateral color correction for Example 3 in wide angle format. FIG. 8B shows lateral color correction for Example 3 in telephoto format.

Again referring to FIGS. 5A and 5B, a fourth example is shown. Common lens element 26 is a meniscus glass lens and includes spherical surfaces $S_1$ and $S_2$ with surface $S_1$ being convex toward the object plane 40. Wide angle lens element 28 is plastic (for example, acrylic plastic or PMMA, etc.) and includes surfaces $S_3$ and $S_4$ which are both aspheric. Telephoto lens element 32 is plastic (styrene) and includes surfaces $S_5$ and $S_6$ which are both aspheric.

EXAMPLE 4

FIGS. 5A and 5B

| Surface | Radius | Thickness | Index | V |
|---|---|---|---|---|
| S₁ | 10.2817 | 2.4831 | 1.517 | 64.2 |
| S₂ | 18.7000 | 0.3000 | | |
| STOP wide angle | diaphragm | 2.4529 | | |
| S₃ | asphere | 1.6785 | 1.492 | 57.4 |
| S₄ telephoto | asphere | | | |
| S₅ | asphere | 1.6785 | 1.590 | 30.9 |
| S₆ | asphere | | | |

ASPHERIC EQUATION for surfaces S₃ and S₄:

$$X = \frac{CY^2}{1 + \sqrt{1 - (k+1)C^2Y^2}} + DY^4 + EY^6 + FY^8 + GY^{10} + HY^{12} + IY^{14} + JY^{16}$$

-continued

Surface S₃:

C = −0.12452800  D = −0.105809E−02  F = −0.880093E−04  H = 0.368912E−05
k = 0           E = 0.426807E−03    G = −0.689681E−05  I = −0.395997E−06
                                                       J = 0.142000E−07

Surface S₄:

C = −0.14260139  D = 0.333729E−03   F = 0.698542E−04   H = 0.957627E−06
k = 0           E = −0.216354E−03   G = −0.115044E−04  I = −0.398302E−07
                                                       J = 0.665202E−09

ASPHERIC EQUATION for surfaces S₅ and S₆:

$$X = \frac{CY^2}{1 + \sqrt{1 - (k+1)C^2Y^2}} + DY^4 + EY^6 + FY^8 + GY^{10}$$

Surface S₅:

C = −0.03705074  D = 0.235494E−03   F = 0.360128E−06
k = 0           E = −0.765443E−06   G = −0.927079E−07

Surface S₆:

C = −0.03041180  D = 0.345056E−03   F = 0.467614E−06
k = 0           E = 0.931367E−07    G = −0.395774−07

| | Focal Length | Back Focus | Front Focus | Best Focus | Lens Length | Exit Pupil Diameter | Relative Aperture |
|---|---|---|---|---|---|---|---|
| Wide angle | 28.80 | 25.32 | 25.93 | 0.183 | 7.9144 | 2.92 | 10 |
| Telephoto | 46.45 | 39.12 | 48.37 | −0.018 | 7.9144 | 3.98 | 11 |

In wide angle, Example 4 has a cylindrically curved image plane with a radius=−120.0; a semi-field of 36.52°; and a semi-diagonal of 21.63 (Illum.), 20.58 (Image). The first lens element 26 has a focal length of 40.000 mm, and the second lens element 28 has a focal length of 72.521 mm.

In telephoto, Example 4 has a cylindrically curved image plane with a radius=−120.0; a semi-field of 24.35°; and a semi-diagonal of 21.63 (Illum.), 20.58 (Image). The first lens element 26 has a focal length of 40.000 mm, and the second lens element 32 has a focal length of −283.278 mm.

Figure 7A:
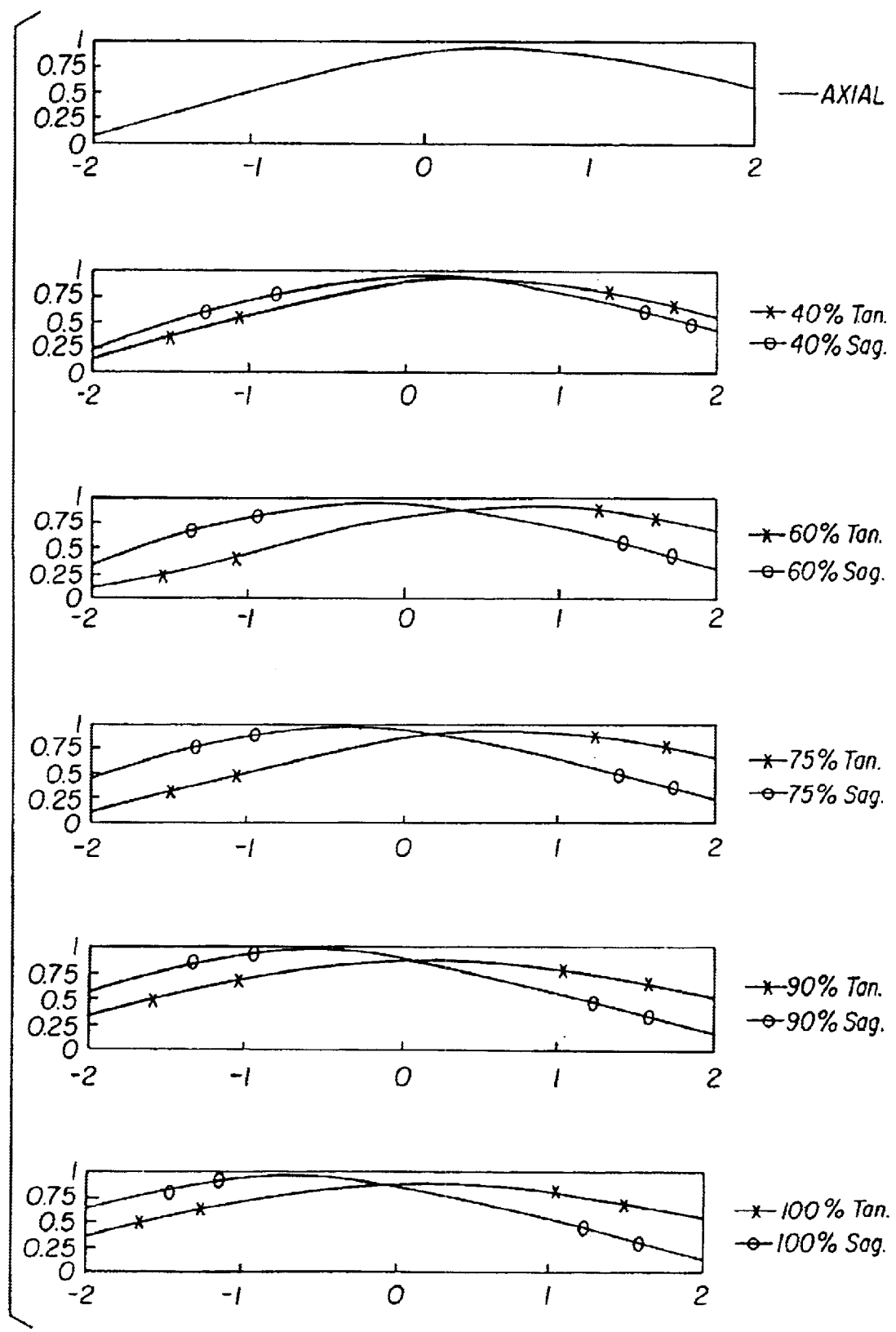
Figure 7B:
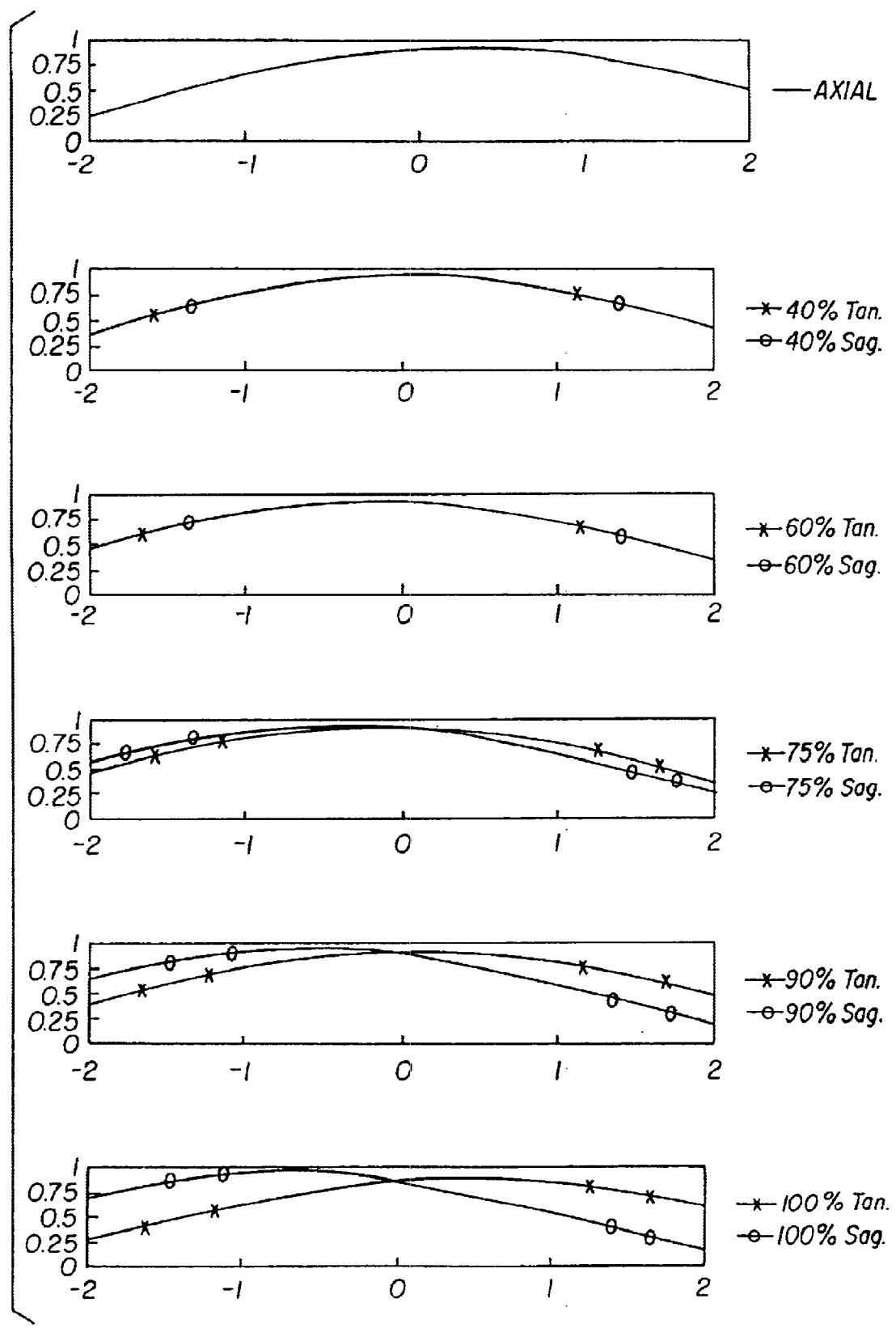

Referring to FIGS. 7A–7B, MTF performance plots are measured at best focus using weighted wavelengths (440 nanometers at 15%, 546.1 nanometers at 50%, and 650 nanometers at 35%) at a frequency of 4.45 cycles per millimeter with full field (100%) being 20.58 mm. FIG. 7A shows MTF plots for Example 4 in wide angle format. FIG. 7B shows MTF plots for Example 4 in telephoto format. MTF plots are centered along the diagonal of the film cylinder (long dimension of 24×36 mm image format is measured along cylinder radius of curvature in all examples).

Figure 9A:
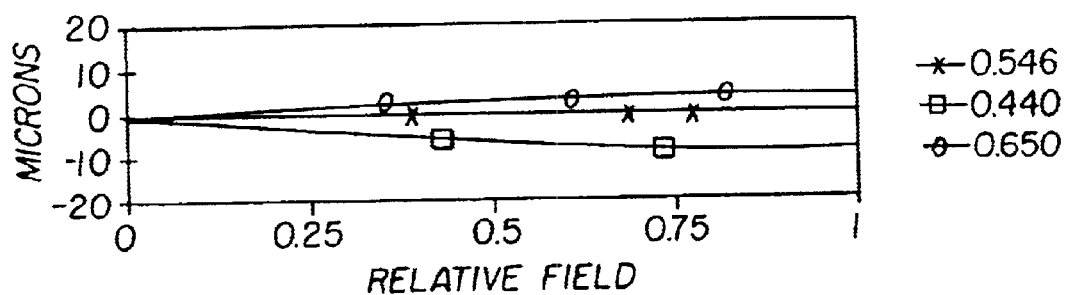
Figure 9B:
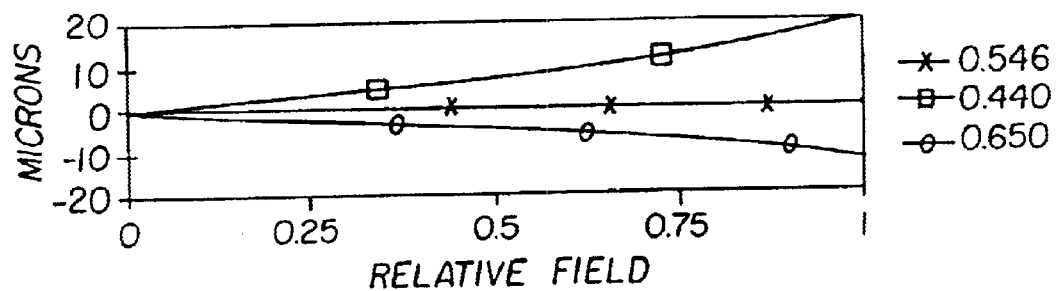

FIGS. 9A–9B describe additional performance characteristics of the variable focal length lens 20 of Example 4. FIG. 9A shows lateral color correction for Example 4 in wide angle format. FIG. 9B shows lateral color correction for Example 4 in telephoto format.

Figure 10A:
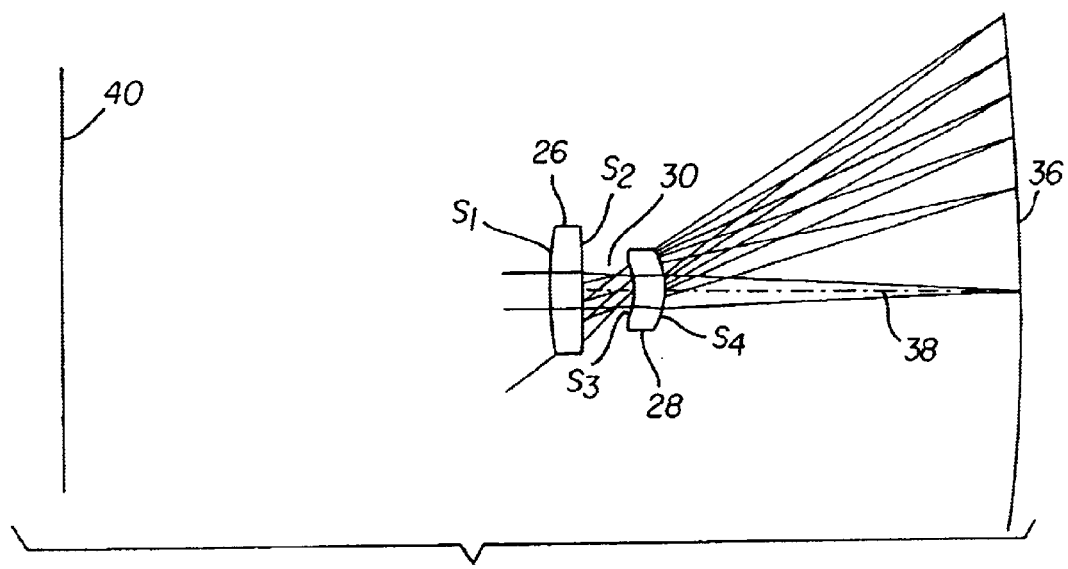
FIGS. 10A and 10B are cross sectional views of fifth and sixth numerical examples made in accordance with the present invention in a wide angle zoom position and a telephoto zoom position.
Figure 10B:
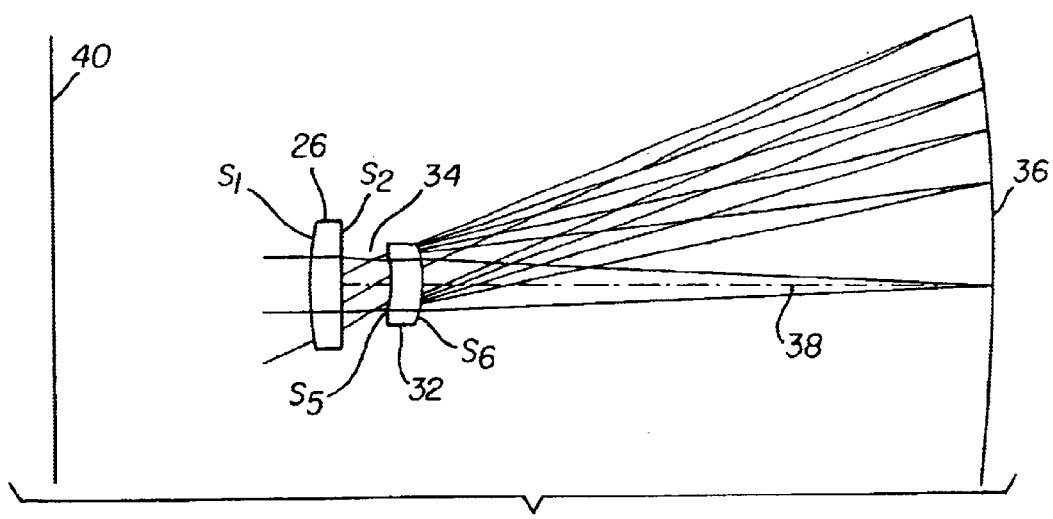

Referring to FIGS. 10A and 10B, a fifth example of the two position variable focal length lens 20 is shown. FIG. 10A shows two position variable focal length lens 20 in a wide angle format or position while FIG. 10B shows two position variable focal length lens 20 in a telephoto format or position. Common lens element 26 is glass, biconvex, and includes spherical surfaces $S_1$ and $S_2$. Wide angle lens element 28 is plastic (for example, acrylic plastic or PMMA, etc.) and includes surfaces $S_3$ and $S_4$ which are both aspheric. Telephoto lens element 32 is plastic (for example, acrylic plastic or PMMA, etc.) and includes surfaces $S_5$ and $S_6$ which are both aspheric.

EXAMPLE 5

FIGS. 10A and 10B

| Surface | Radius | Thickness | Index | V |
|---|---|---|---|---|
| S₁ | 28.2156 | 2.5355 | 1.517 | 64.2 |
| S₂ | −76.0000 | 2.1037 | | |
| STOP | diaphragm | 1.2977 | | |
| wide angle | | | | |
| S₃ | asphere | 2.5000 | 1.492 | 57.4 |
| S₄ | asphere | | | |
| telephoto | | | | |
| S₅ | asphere | 2.5000 | 1.492 | 57.4 |
| S₆ | asphere | | | |

ASPHERIC EQUATION for surfaces S₃–S₆:

$$X = \frac{CY^2}{1 + \sqrt{1 - (k+1)C^2Y^2}} + DY^4 + EY^6 + FY^8 + GY^{10}$$

Surface S₃:

C = −0.16827865  D = −0.784385E−03  F = 0.323412E−04
k = 0           E = 0.140733E−03    G = −0.506861E−05

Surface S₄:

C = −0.17451256  D = 0.127490E−03   F = 0.586203E−05
k = 0           E = −0.164813E−04   G = −0.177061E−06

Surface S₅:

C = −0.13923392  D = 0.450399E−03   F = 0.996882E−05
k = 0           E = −0.176693E−04   G = −0.660403E−06

-continued

Surface $S_6$:

| C = −0.12294855 | D = 0.275038E−03 | F = 0 |
| k = 0 | E = 0.133983E−04 | G = 0 |

| | Focal Length | Back Focus | Front Focus | Best Focus | Lens Length | Exit Pupil Diameter | Relative Aperture |
|---|---|---|---|---|---|---|---|
| Wide angle | 28.81 | 27.81 | 22.19 | 0.166 | 8.4369 | 3.20 | 10 |
| Telephoto | 46.46 | 43.86 | 41.51 | −0.167 | 8.4369 | 4.40 | 11 |

In wide angle, Example 5 has a cylindrically curved image plane with a radius=−120.0; a semi-field of 36.51°; and a semi-diagonal of 21.63 (Illum.), 20.58 (Image). The first lens element 26 has a focal length of 40.000 mm, and the second lens element 28 has a focal length of 66.395 mm.

In telephoto, Example 5 has a cylindrically curved image plane with a radius=−120.0; a semi-field of 24.83°; and a semi-diagonal of 21.63 (Ilum.), 20.58 (Image). The first lens element 26 has a focal length of 40.000 mm, and the second lens element 32 has a focal length of −946.925 mm.

Figure 11A:
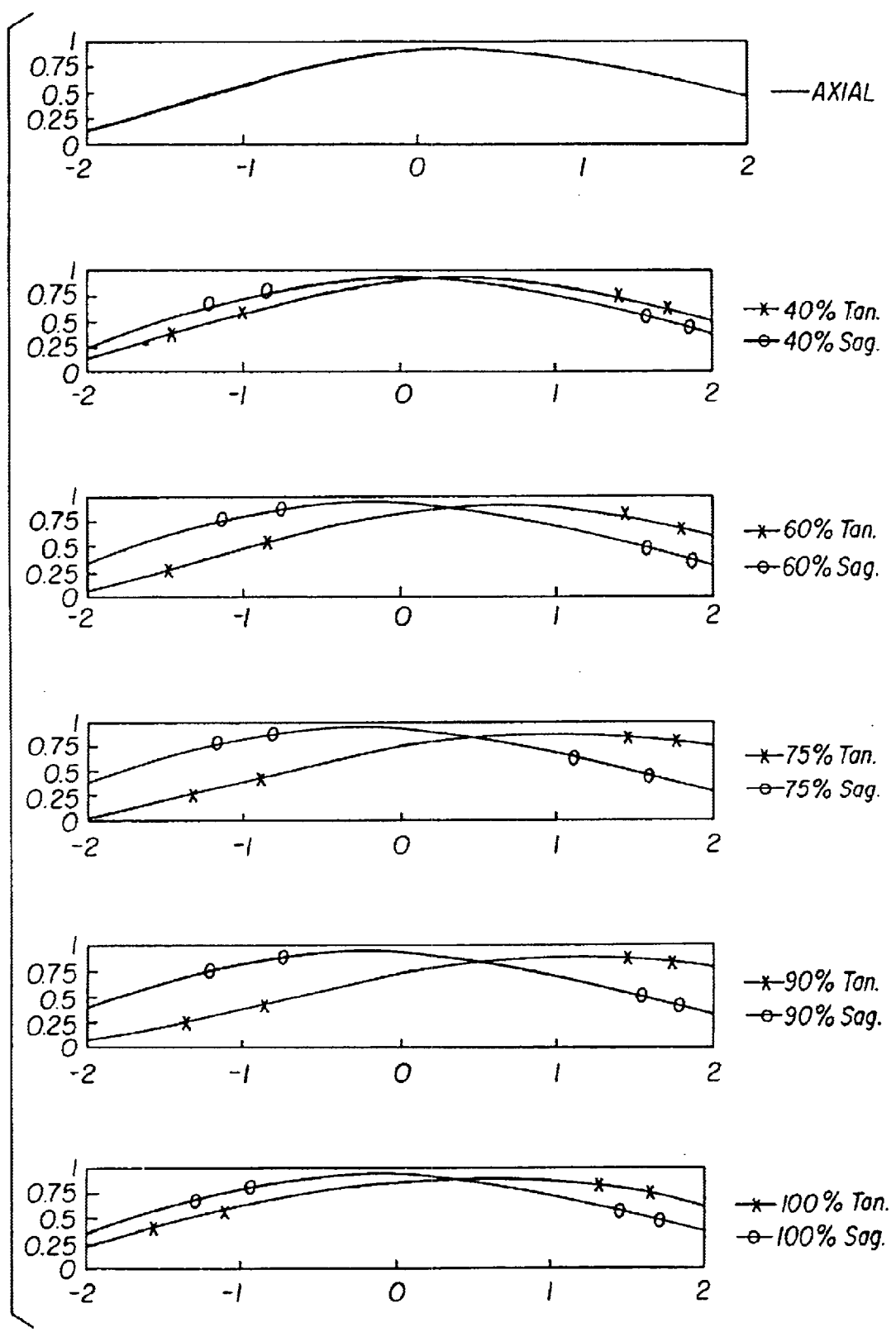
FIGS. 11A–12B are MTF performance plots of the third and fourth examples, respectively, shown in FIGS. 10A and 10B.
Figure 11B:
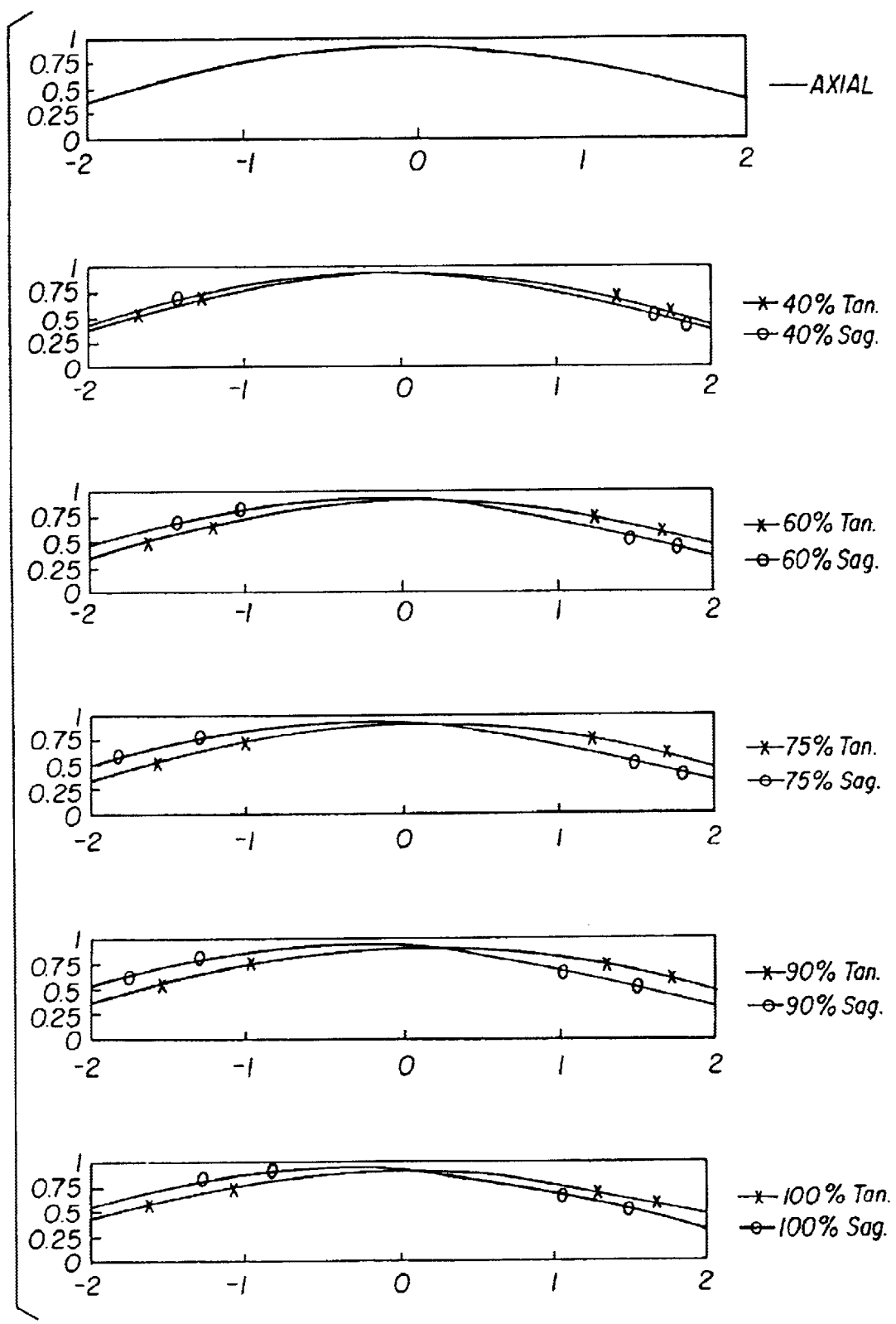

Referring to FIGS. 11A–11B, MTF performance plots are measured at best focus using weighted wavelengths (440 nanometers at 15%, 546.1 nanometers at 50%, and 650 nanometers at 35%) at a frequency of 4.45 cycles per millimeter with full field (100%) being 20.58 mm., FIG. 11A shows MTF plots for Example 5 in wide angle format. FIG. 11B shows MTF plots for Example 5 in telephoto format. MTF plots are centered along the diagonal of the film cylinder (long dimension of 24×36 mm image format is measured along cylinder radius of curvature in all examples).

Figure 13A:
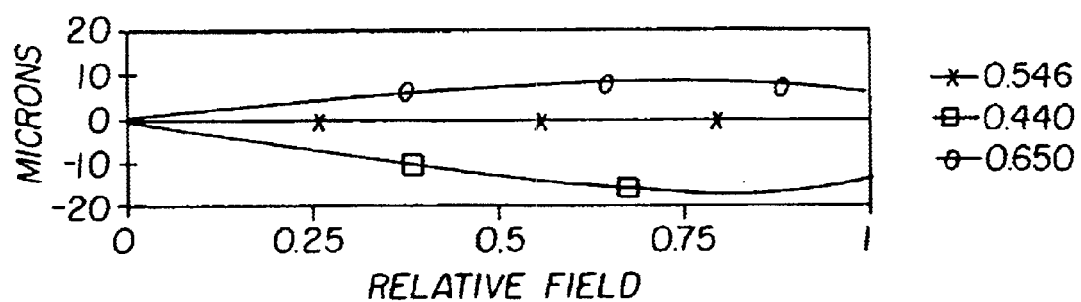
FIGS. 13A–14B are lateral color aberration curves for the third and fourth examples, respectively, shown in FIGS. 10A and 10B.
Figure 13B:
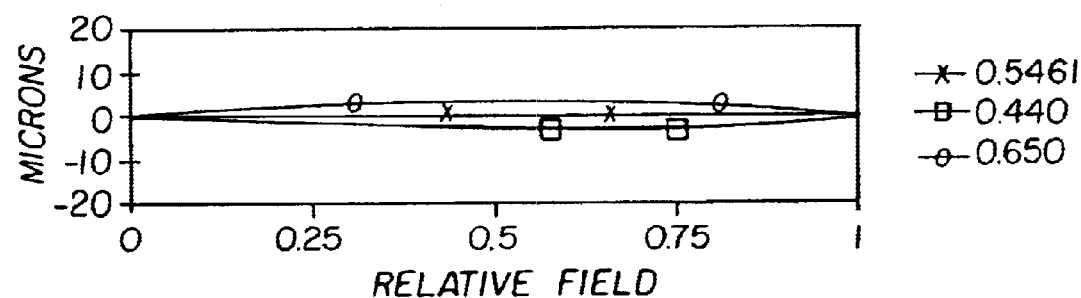

FIGS. 13A–13B describe additional performance characteristics of the variable focal length lens 20 of Example 5. FIG. 13A shows lateral color correction for Example 5 in wide angle format. FIG. 13B shows lateral color correction for Example 5 in telephoto formal Again referring to FIGS. 10A and 10B, a sixth example is shown. Common lens element 26 is glass, biconvex, and includes spherical surfaces $S_1$ and $S_2$. Wide angle lens element 28 is plastic (for example, acrylic plastic or PMMA, etc.) and includes surfaces $S_3$ and $S_4$ which are both aspheric. Telephoto lens element 32 is plastic (styrene) and includes surfaces $S_5$ and $S_6$ which are both aspheric.

EXAMPLE 6

FIGS. 10A and 10B

| Surface | Radius | Thickness | Index | V |
|---|---|---|---|---|
| $S_1$ | 25.9540 | 2.5382 | 1.517 | 64.2 |
| $S_2$ | −100.0000 | 2.6508 | | |
| STOP wide angle | diaphragm | 1.2263 | | |
| $S_3$ | asphere | 2.5000 | 1.492 | 57.4 |
| $S_4$ telephoto | asphere | | | |
| $S_5$ | asphere | 2.5000 | 1.590 | 30.9 |
| $S_6$ | asphere | | | |

ASPHERIC EQUATION for surfaces $S_3$ and $S_4$:

$$X = \frac{CY^2}{1 + \sqrt{1 - (k+1)C^2 Y^2}} + DY^4 + EY^6 + FY^8 + GY^{10} + HY^{12} + IY^{14} + JY^{16}$$

Surface $S_3$:

| C = −0.16514207 | D = −0.141911E−02 | F = −0.886266E−03 | H = −0.885040E−04 |
| k = 0 | E = 0.125105E−02 | G = 0.383751E−03 | I = 0.105047E−04 |
| | | | J = −0.53105E−06 |

Surface $S_4$:

| C = −0.17251917 | D = 0.378557E−03 | F = 0.451695E−04 | H = 0.157973E−06 |
| k = 0 | E = −0.168890E−03 | G = −0.481651E−05 | I = 0.115974E−07 |
| | | | J = −0.764399E−09 |

ASPHERIC EQUATION for surfaces $S_5$ and $S_6$:

$$X = \frac{CY^2}{1 + \sqrt{1 - (k+1)C^2 Y^2}} + DY^4 + EY^6 + FY^8 + GY^{10}$$

Surface $S_5$:

| C = −0.13066330 | D = 0.314620E−03 | F = 0.490785E−06 |
| k = 0 | E = 0.206307E−04 | G = 0.569552E−07 |

-continued

Surface $S_6$:

C = −0.11505867  D = 0.210325E−03  F = −0.865282E−06
k = 0            E = 0.170648E−04   G = 0.394302E−07

| | Focal Length | Back Focus | Front Focus | Best Focus | Lens Length | Exit Pupil Diameter | Relative Aperture |
|---|---|---|---|---|---|---|---|
| Wide angle | 28.81 | 27.27 | 22.06 | 0.372 | 9.9153 | 3.13 | 10 |
| Telephoto | 46.52 | 43.56 | 41.41 | −0.147 | 9.9153 | 4.35 | 11 |

In wide angle, Example 6 has a cylindrically curved image plane with a radius=−120.0; a semi-field of 35.87°; and a semi-diagonal of 21.63 (Illum.), 20.58 (Image). The first lens element 26 has a focal length of 40.000 mm, and the second lens element 28 has a focal length of 65.496 mm.

In telephoto, Example 6 has a cylindrically curved image plane with a radius=−120.0; a semi-field of 24.70°; and a. semi-diagonal of 21.63 (Illum.), 20.58 (Image). The first lens element 26 has a focal length of 40.000 mm, and the second lens element 32 has a focal length of −1060.655 mm.

Figure 12A:
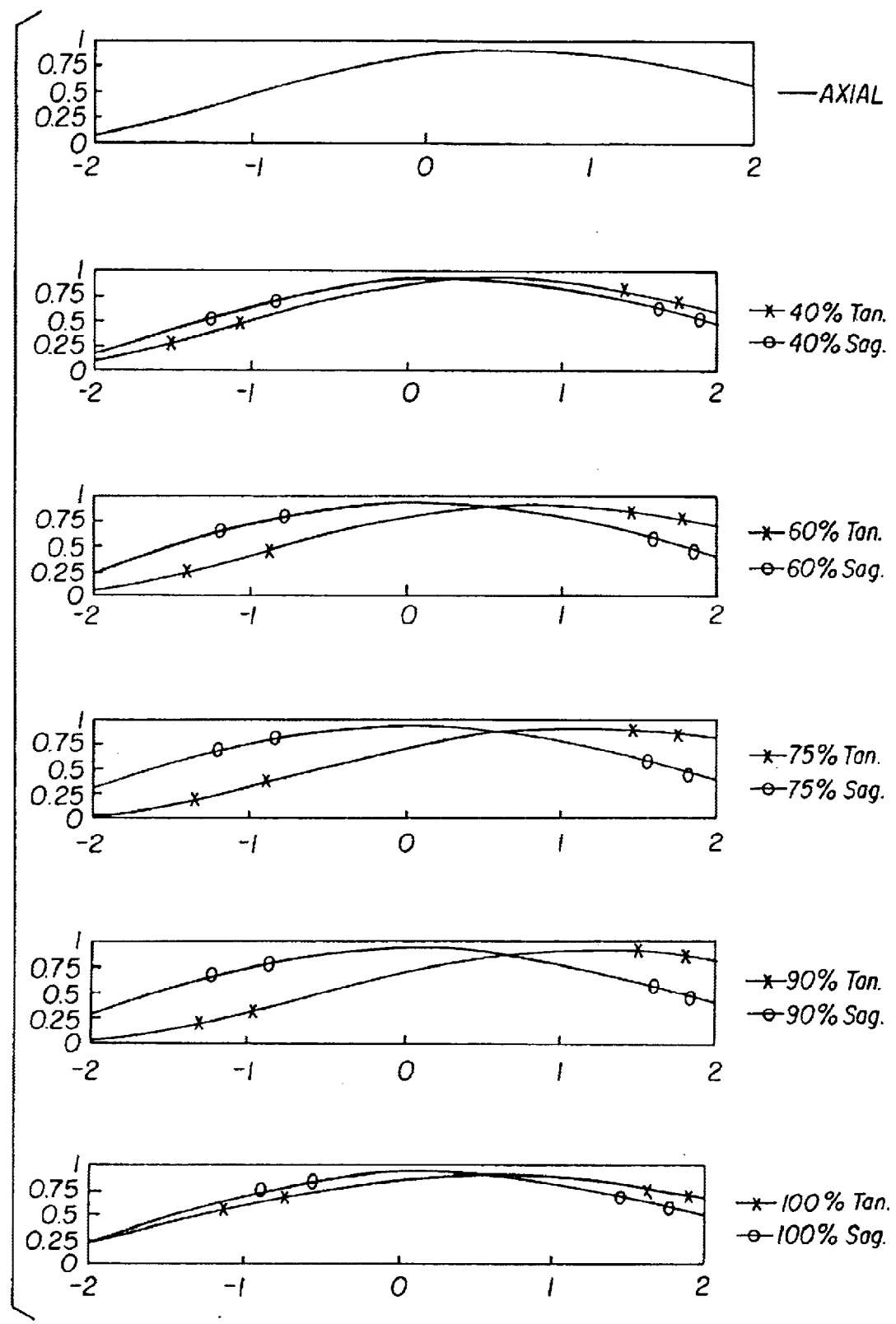
Figure 12B:
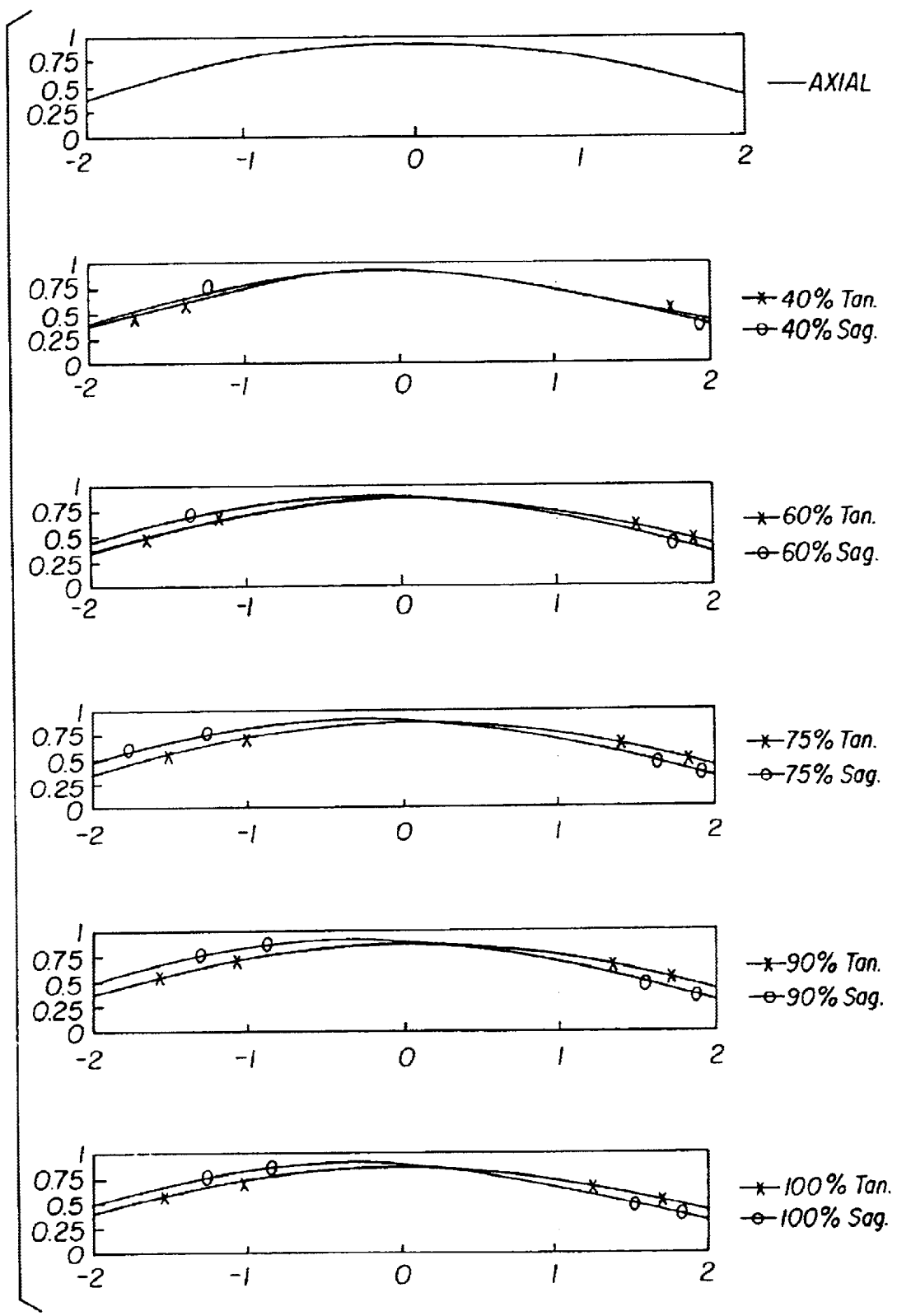

Referring to FIGS. 12A–12B, MTF performance plots are measured at best focus using weighted wavelengths (440 nanometers at 15%, 546.1 nanometers at 50%, and 650 nanometers at 35%) at a frequency of 4.45 cycles per millimeter with full field (100%) being 20.58 mm. FIG. 12A shows MTF plots for Example 6 in wide angle format FIG. 12B shows MTF plots for Example 6 in telephoto format. MTF plots are centered along the diagonal of the film cylinder (long dimension of 24×36 mm image format is measured along cylinder radius of curvature in all examples).

Figure 14A:
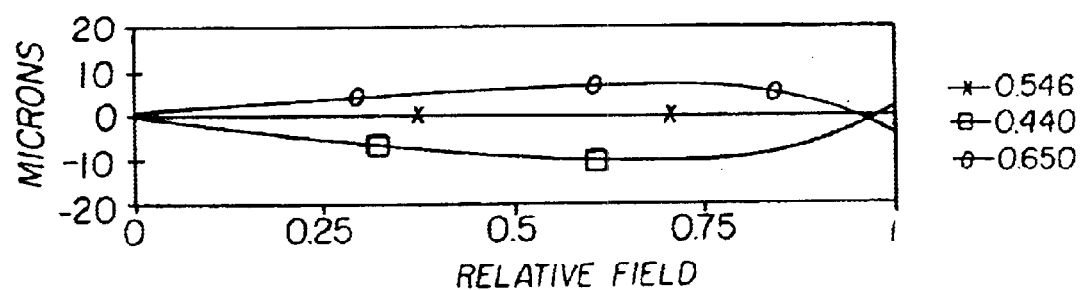
Figure 14B:
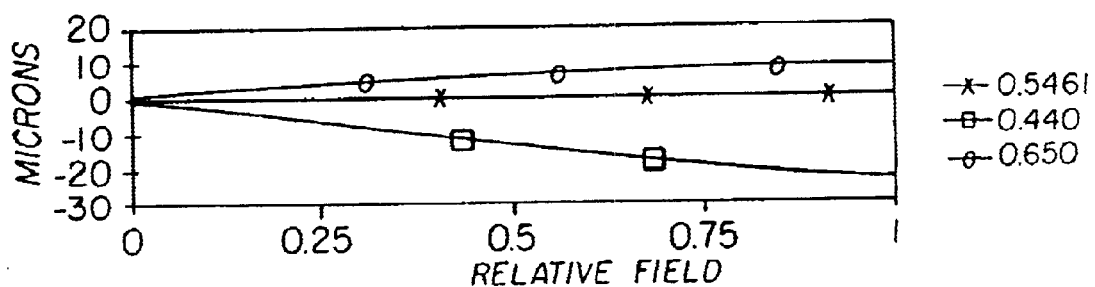

FIGS. 14A–14B describe additional performance characteristics of the variable focal length lens 20 of Example 6. FIG. 14A shows lateral color correction for Example 6 in wide angle format. FIG. 14B shows lateral color correction for Example 6 in telephoto format.

The common lens element 26 of the two position variable focal length lens 20 has an image side surface $S_2$ that preferably satisfies the condition $(1/−20.8) \leq c \leq (1/5)$, where c is the curvature of the image side surface. More preferably, the common lens element 26 satisfies the condition $(1/−76) \leq c \leq (1/18.7)$, where c is the curvature of the image side surface $S_2$. Still more preferably, the common lens element 26 satisfies the condition: $(1/−100) \leq c \leq (1/25.5)$, where c is the curvature of the image side surface $S_2$, and more preferably, the common lens element 26 satisfies the condition: c=0, where c is the curvature of the image side surface $S_2$ of the common lens element 26.

The invention has been described in detail with particular reference to certain preferred embodiments thereof, but it will be understood that variations and modifications can be effected within the scope of the invention.

What is claimed is:

1. A two position variable focal length lens comprising:
   a common lens element moveably positioned on an optical axis;
   a wide angle lens element moveable between a first location removed from the optical axis and a first position on the optical axis on an image side of the common lens element; and
   a telephoto lens element moveable between a second location removed from the optical axis and a second position on the optical axis on the image side of the common lens element, wherein a magnification ratio change is effected by moving the common lens element along the optical axis and switching between the wide angle lens element located at the first position on the optical axis and the telephoto lens element located at the second position on the optical axis and the two position variable focal length lens satisfies the following condition: $|f_C - f_{ZT}| < |f_C - f_{ZW}|$, where $f_C$ is a focal length of the common lens element, $f_{ZT}$ is a focal length of the two position variable focal length lens in a telephoto position, and $f_{ZW}$ is a focal length of the two position variable focal length lens in a wide angle position.

2. The two position variable focal length lens of claim 1, wherein the common lens element is a glass element.

3. The two position variable focal length lens of claim 1, wherein the variable focal length lens satisfies the following condition: $f_C/f_{ZT} > 0.85$.

4. The two position variable focal length lens of claim 1, wherein the wide angle lens element has two aspheric surfaces.

5. The two position variable focal length lens of claim 1, wherein the telephoto lens element has two aspheric surfaces.

6. The two position variable focal length lens of claim 1, wherein both the wide angle lens element and the telephoto lens element are made from plastic.

7. The two position variable focal length lens of claim 1, wherein the common lens element has an image side surface and satisfies the following condition: $-(1/76) \leq c \leq (1/18.7)$, where c is the curvature of the image side surface of the common lens element.

8. The two position variable focal length lens of claim 7, wherein the common lens element satisfies the following condition: c=0, where c is the curvature of the image side surface of the common lens element.

9. The two position variable focal length lens of claim 1, wherein the wide angle lens element is meniscus having a convex surface on the image side of the wide angle lens element and the telephoto lens element is meniscus having a convex surface on the image side of the telephoto lens element.

10. A two position variable focal length lens comprising:
    a common lens element moveably positioned on an optical axis, the common lens element having an image side surface, the image side surface having a curvature, the common lens element satisfying the following condition: $-(1/20.8) \leq c \leq (1/5)$, where c is the curvature of the image side surface;
    a wide angle lens element moveable between a first location removed from the optical axis and a first position on the optical axis on an image side of the common lens element; and
    a telephoto lens element moveable between a second location removed from the optical axis and a second position on the optical axis on the image side of the common lens element, wherein a magnification ratio change is effected by moving the common lens element along the optical axis and switching between the wide angle lens element located at the first position on the optical axis and the telephoto lens element located at the second position on the optical axis.

11. The two position variable focal length lens of claim 10, wherein the telephoto lens element is a plastic element made from acrylic plastic.

12. The two position variable focal length lens of claim 10, wherein the telephoto lens element is a plastic element made from styrene.

13. The two position variable focal length lens of claim 10, wherein the common lens element satisfies the following condition: $-(1/76) \leq c \leq (1/18.7)$, where c is the curvature of the image side surface of the common lens element.

14. The two position variable focal length lens of claim 10, wherein the common lens element satisfies the following condition: $-(1/100) \leq c \leq (1/25.5)$, where c is the curvature of the image side surface of the common lens element.

15. The two position variable focal length lens of claim 10, wherein the common lens element satisfies the following condition: $c=0$, where c is the curvature of the image side surface of the common lens element.

16. A two position variable focal length lens comprising:
a common lens element moveably positioned on an optical axis;
a wide angle lens element moveable between a first location removed from the optical axis and a first position on the optical axis on an image side of the common lens element;
a first aperture stop moveably positioned with the wide angle lens element on an object side of the wide angle lens element;
a telephoto lens element moveable between a second location removed from the optical axis and a second position on the optical axis on the image side of the common lens element; and
a second aperture stop moveably positioned with the telephoto lens element on an object side of the telephoto lens element, wherein a magnification ratio change is effected by moving the common lens element along the optical axis and switching between the first aperture stop and the wide angle lens element located at the first position on the optical axis and the second aperture stop and the telephoto lens element located at the second position on,the optical axis such that a distance between the common lens element and the first aperture stop is equivalent to a distance between the common lens element and the second aperture stop.

17. The two position variable focal length lens of claim 16, wherein the common lens element is meniscus having a convex surface on an object side of the common lens element.

18. The two position variable focal length lens of claim 16, wherein the common lens element is biconvex.

19. The two position variable focal length lens of claim 16, wherein the common lens element satisfies the following condition: $c=0$, where c is the curvature of the image side surface of the common lens element.

20. The two position variable focal length lens of claim 16, wherein the wide angle lens element is meniscus having a convex surface on the image side of the wide angle lens element.

21. The two position variable focal length lens of claim 20, wherein the wide angle lens element is biaspheric.

22. The two position variable focal length lens of claim 16, wherein the telephoto lens element is meniscus having a convex surface on the image side of the telephoto lens element.

23. The two position variable focal length lens of claim 22, wherein the telephoto lens element is biaspheric.

24. The two position variable focal length lens of claim 16, wherein the common lens element is made from glass.

25. The two position variable focal length lens element of claim 24, wherein the wide angle lens element and the telephoto lens element are made from plastic.

26. A two position variable focal length lens comprising:
a common lens element moveably positioned on an optical axis;
a wide angle lens element having aspheric surfaces moveable between a first location removed from the optical axis and a first position on the optical axis on an image side of the common lens element; and
a telephoto lens element having aspheric surfaces moveable between a second location removed from the optical axis and a second position on the optical axis on the image side of the common lens element, wherein a magnification ratio change is effected by moving the common lens element along the optical axis and switching between the wide angle lens element located at the first position on the optical axis and the telephoto lens element located at the second position on the optical axis, the aspheric surfaces of the telephoto lens element having base radii that are larger than corresponding base radii of the aspheric surfaces of the wide angle lens element.

27. A two position variable focal length lens comprising:
a common lens element moveably positioned on an optical axis;
a wide angle lens element moveable between a first location removed from the optical axis and a first position on the optical axis on an image side of the common lens element; and
a telephoto lens element moveable between a second location removed from the optical axis and a second position on the optical axis on the image side of the common lens element, wherein a magnification ratio change is effected by moving the common lens element along the optical axis and switching between the wide angle lens element located at the first position on the optical axis and the telephoto lens element located at the second position on the optical axis and the two position variable focal length lens satisfies the following condition: $f_C > ((f_{ZW} + f_{ZT})/2)$, where $f_C$ is a focal length of the common lens element, $f_{ZW}$ is a focal length of the two position variable focal length lens in a wide angle position, and $f_{ZT}$ is a focal length of the two position variable focal length lens in a telephoto position.

28. A method of changing a magnification ratio from a wide angle position to telephoto angle position comprising:
providing a common lens element positioned at a first location on an optical axis;
providing a wide angle lens element located at a first position on the optical axis on an image side of the common lens element;
providing a telephoto lens element located at a location removed from the optical axis;
moving the common lens element toward an object plane;
moving the telephoto lens element to a second position on the optical axis on the image side of the common lens element; and
removing the wide angle lens from the optical axis.

29. The method of claim 28, wherein moving the telephoto lens element to a second position on the optical axis on the image side of the common lens element and removing the wide angle lens from the optical path occurs simultaneously.

30. The method of claim 28 further comprising:

providing a first aperture stop positioned on an object side of the wide angle lens element, the first aperture stop being spaced apart from the common lens element by a predetermined distance; and removing the first aperture stop from the optical axis with the wide angle lens element.

31. The method of claim 30 further comprising:

providing a second aperture stop positioned on an object side of the telephoto lens element; and moving the second aperture stop to the second position on the optical axis with the telephoto lens element, wherein the second aperture stop is positioned spaced apart from the common lens element at the predetermined distance.

32. The method of claim 28 further comprising:

providing a first aperture stop positioned on an object side of the wide angle lens element.

33. The method according to claim 32 further comprising:

removing the first aperture stop from the optical axis with the wide angle lens element.

34. The method of claim 28 further comprising:

providing a second aperture stop positioned on an object side of the telephoto lens element.

35. The method according to claim 34 further comprising:

moving the second aperture stop to the second position on the optical axis with the telephoto lens element.

* * * * *